Figure 1:
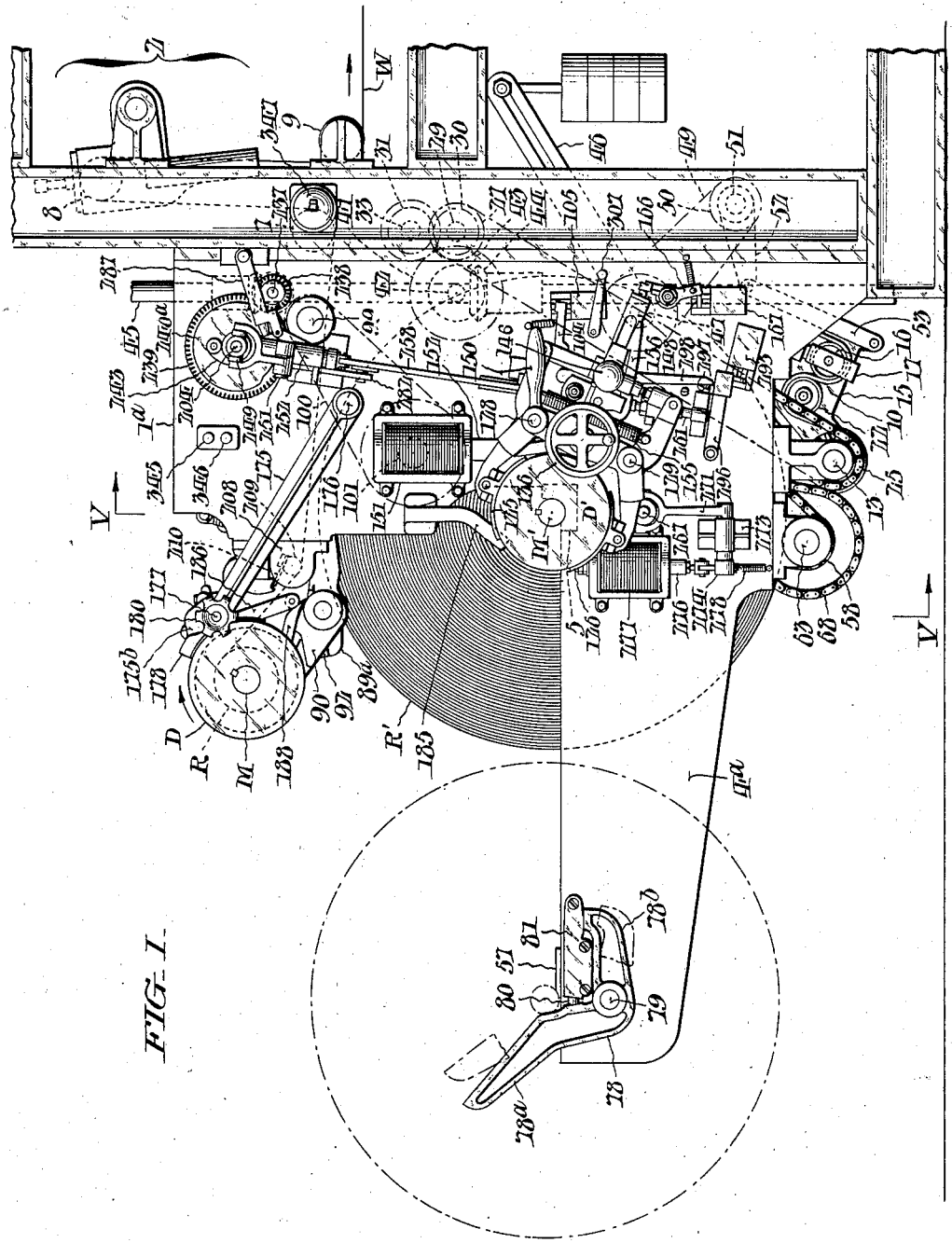

Oct. 7, 1941.    R. R. MILLER    2,258,298
PAPER REPLENISHING MECHANISM FOR ROTARY PRINTING PRESSES
Filed Feb. 1, 1938    31 Sheets-Sheet 1

WITNESSES:
INVENTOR:
Reginald R. Miller,
BY
ATTORNEYS.

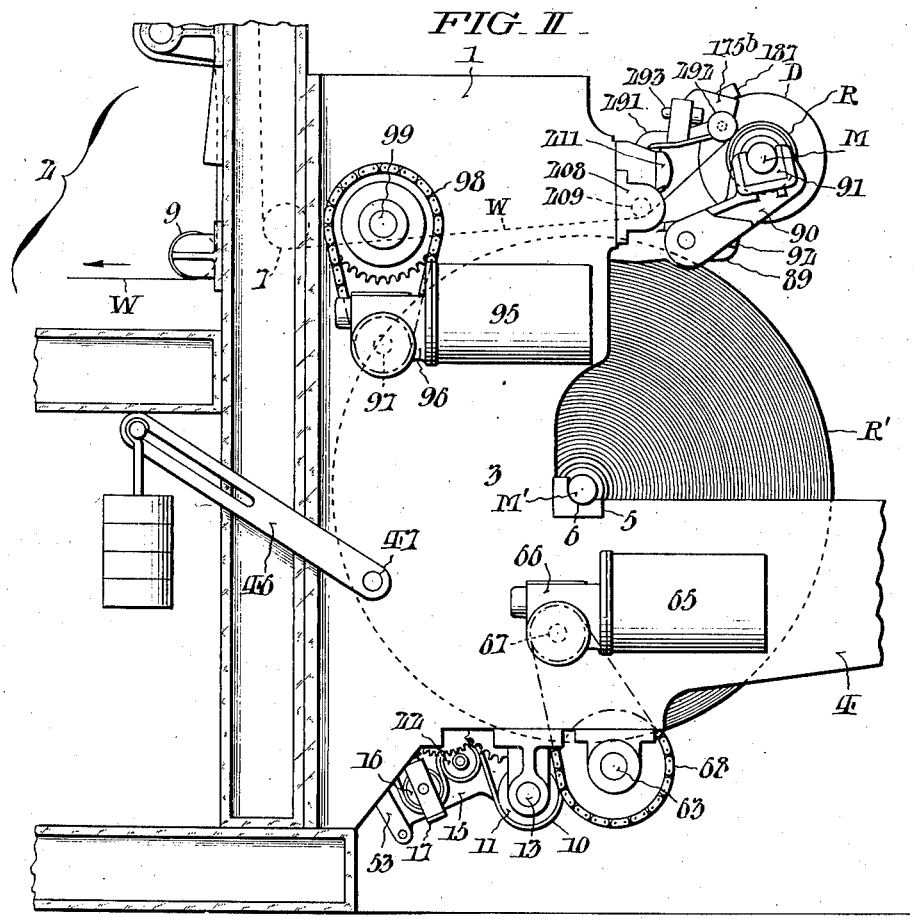

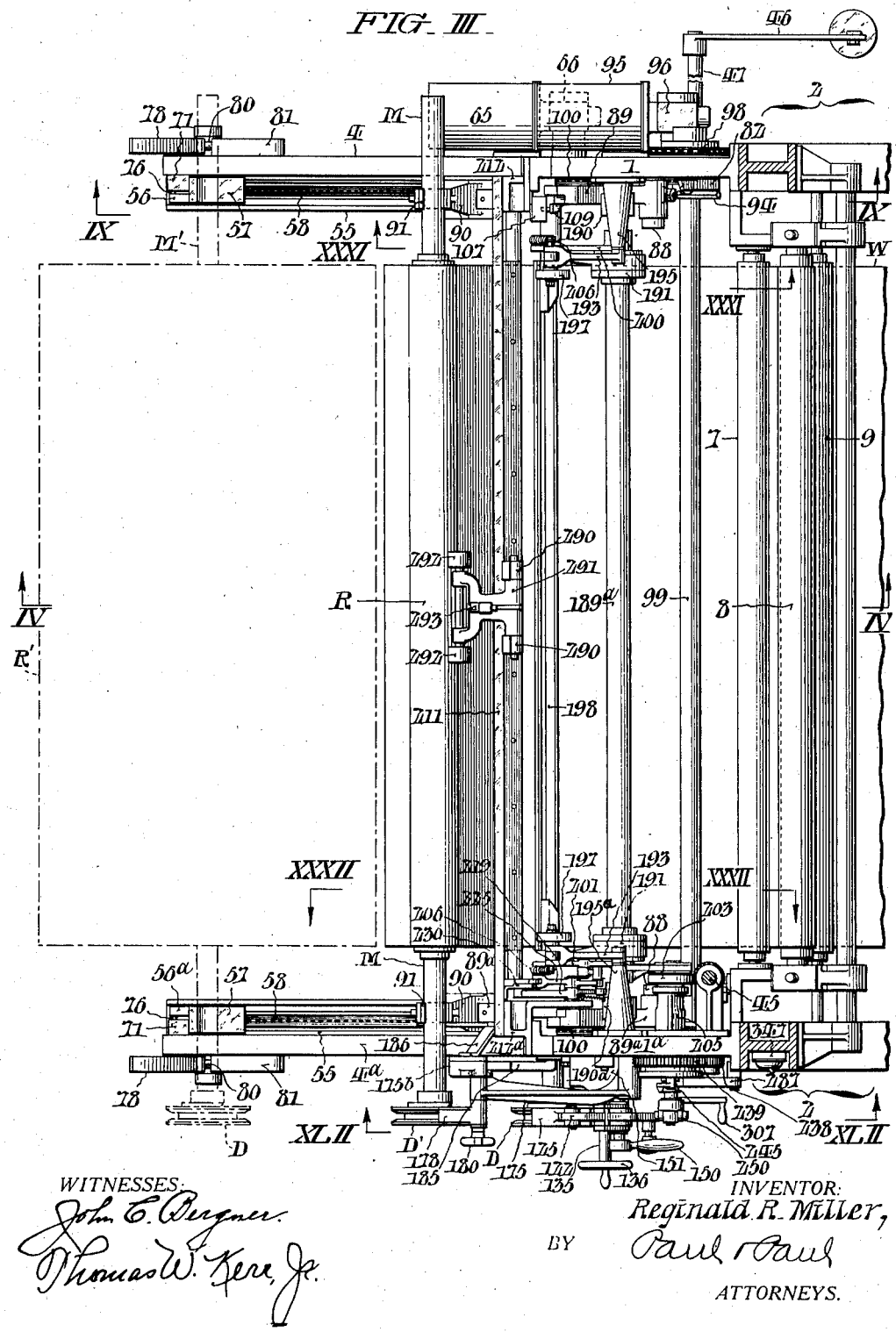

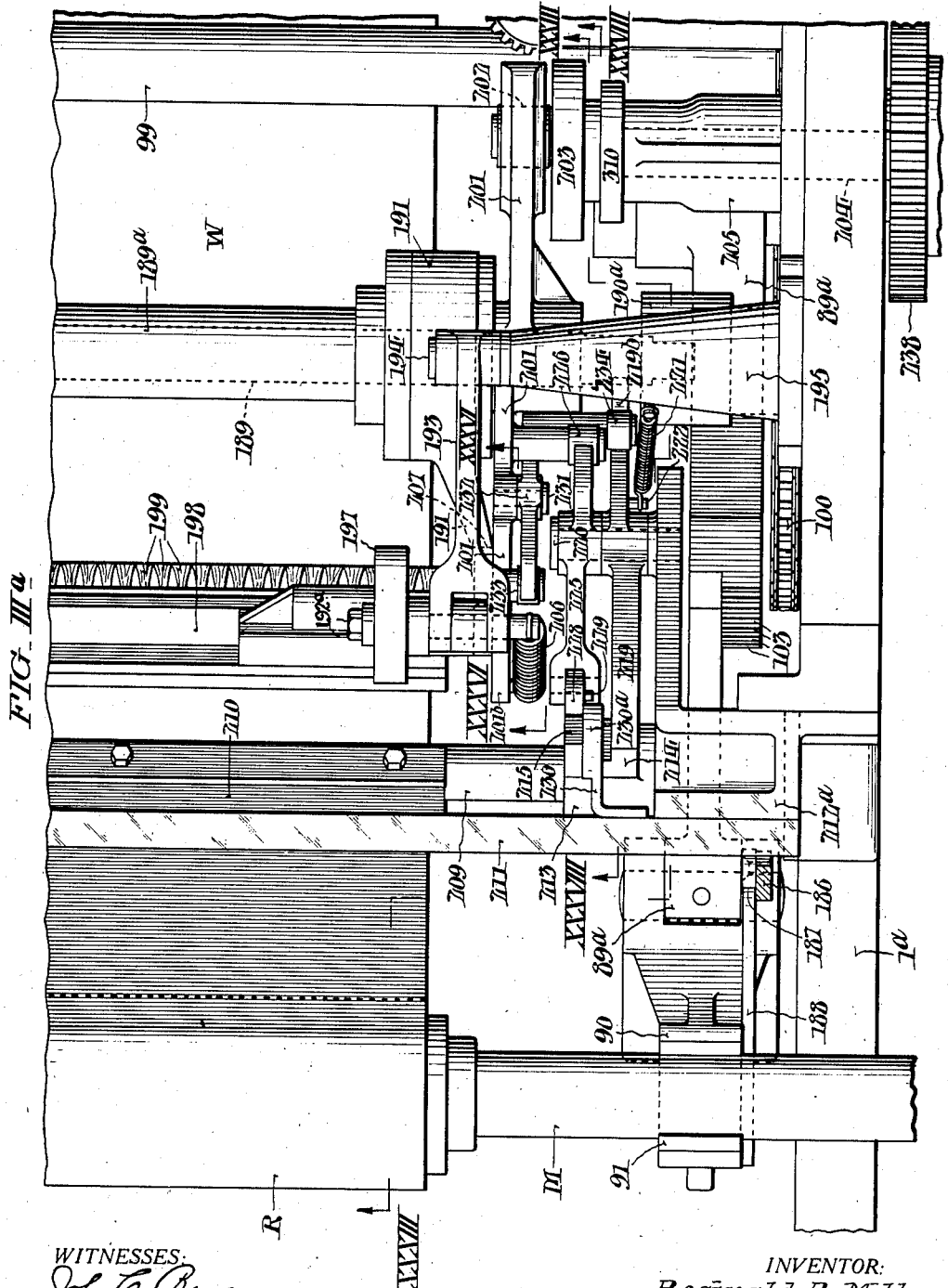

Oct. 7, 1941.  R. R. MILLER  2,258,298
PAPER REPLENISHING MECHANISM FOR ROTARY PRINTING PRESSES
Filed Feb. 1, 1938  31 Sheets-Sheet 5
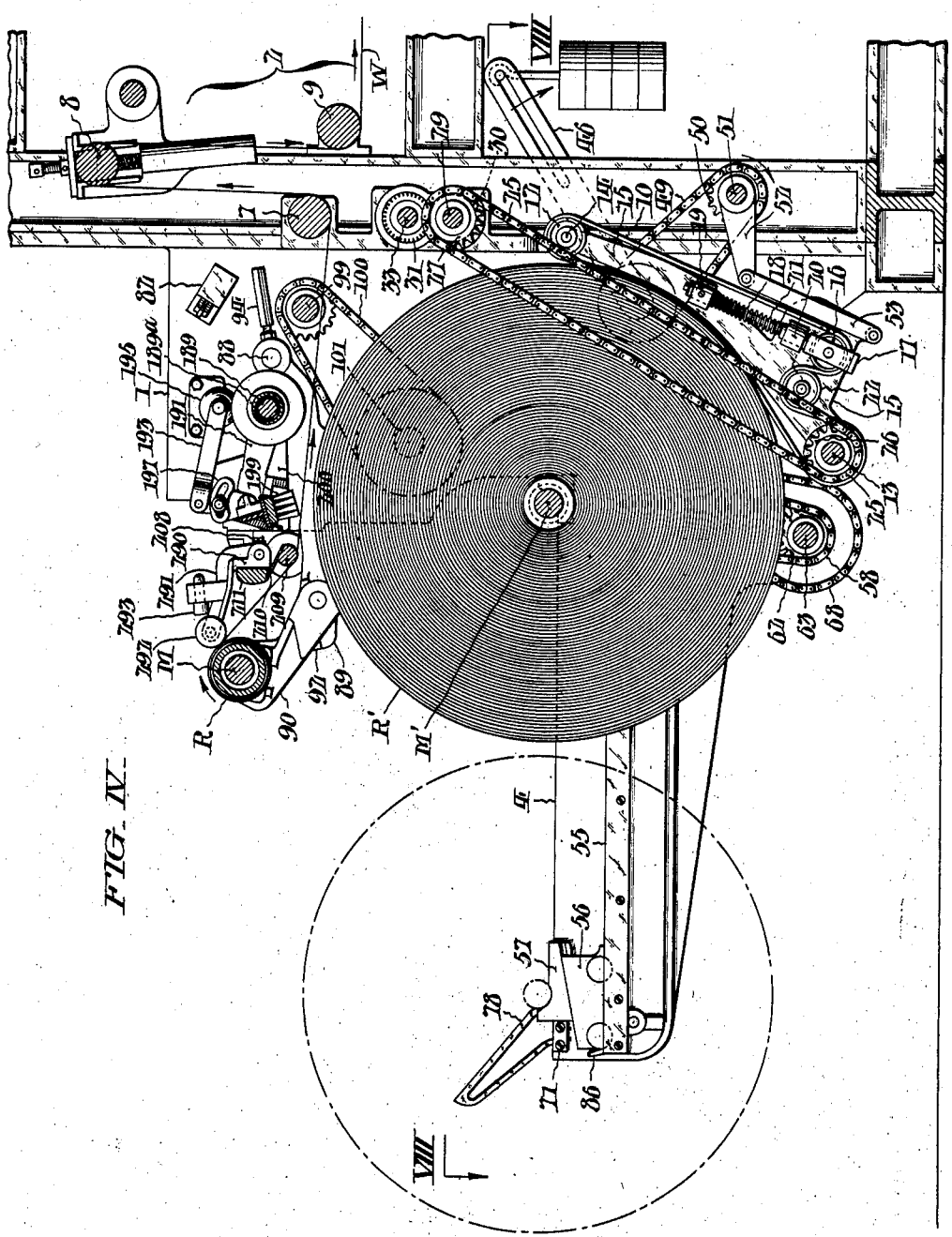
FIG. IV.
WITNESSES:
INVENTOR:
Reginald R. Miller,
BY
ATTORNEYS.

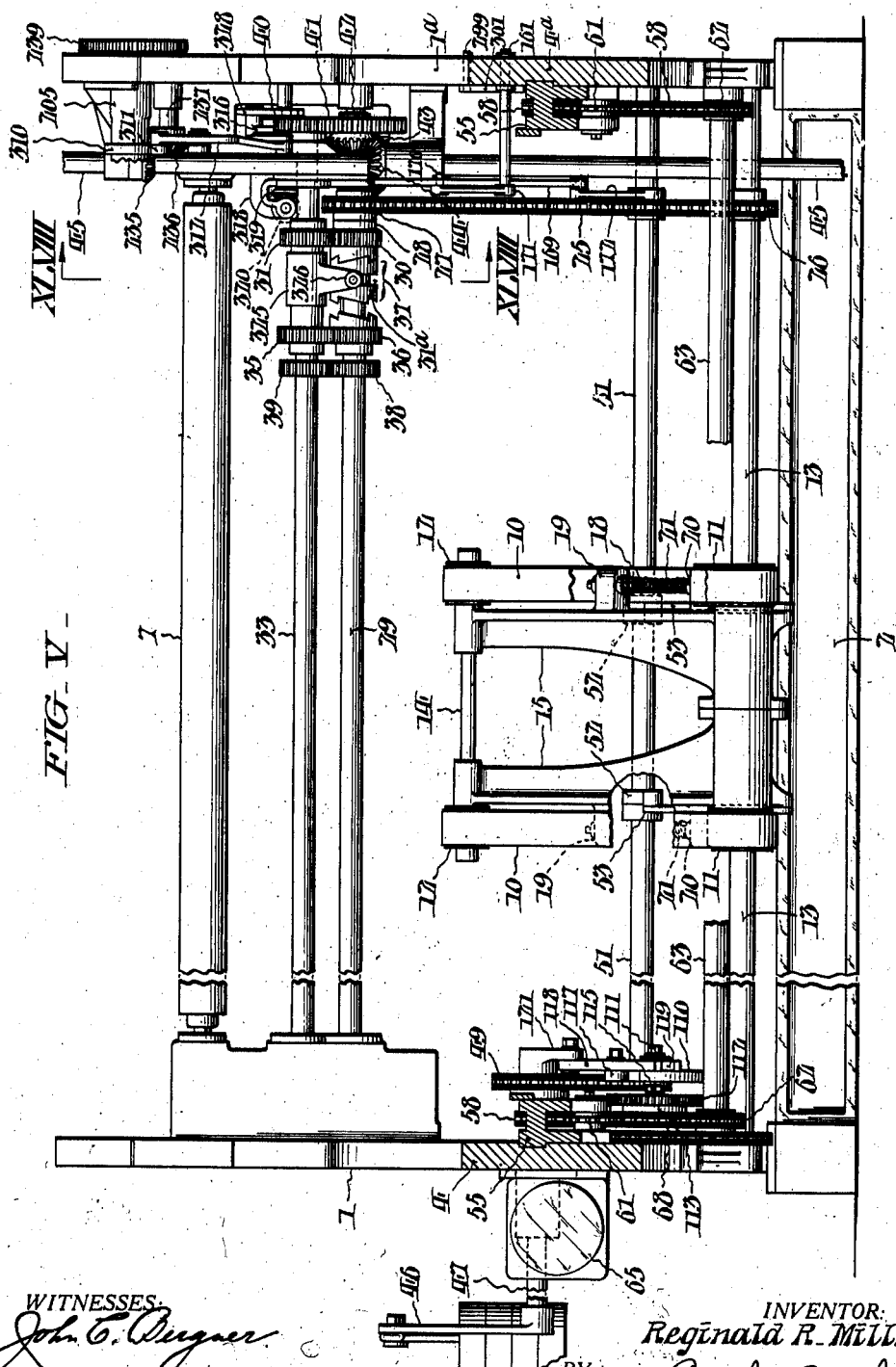

Oct. 7, 1941.  R. R. MILLER  2,258,298
PAPER REPLENISHING MECHANISM FOR ROTARY PRINTING PRESSES
Filed Feb. 1, 1938  31 Sheets-Sheet 7
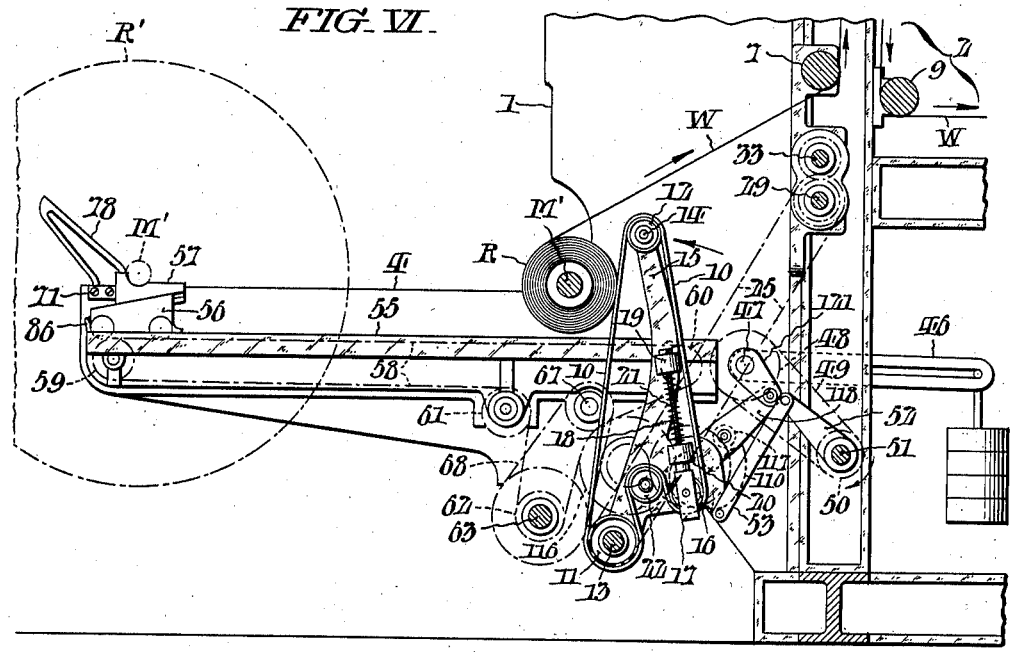
FIG. VI.
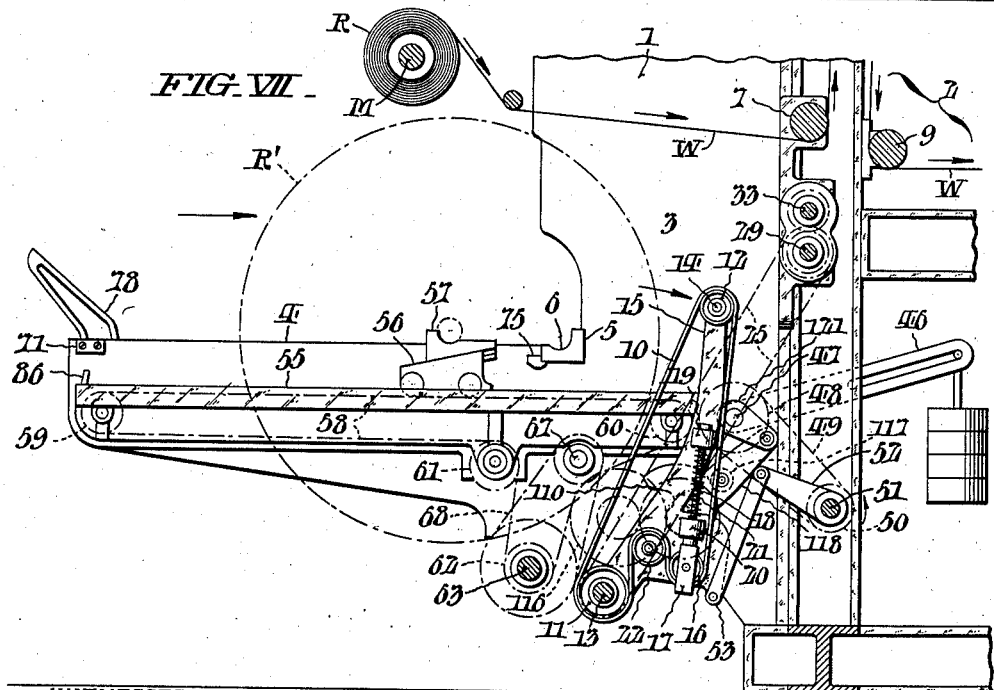
FIG. VII.
WITNESSES:
John E. Bergner
Thomas W. Kerr, Jr.
INVENTOR:
Reginald R. Miller,
BY Paul & Paul
ATTORNEYS.

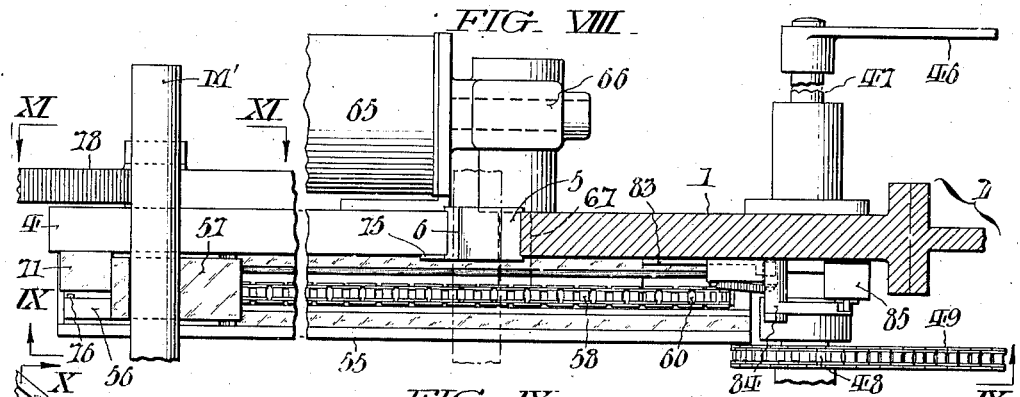
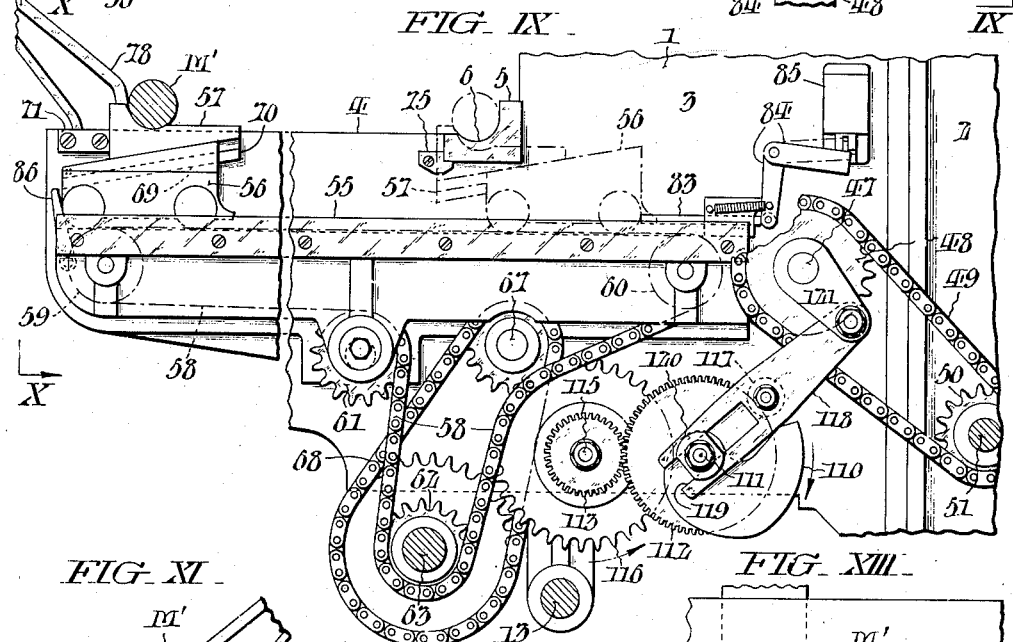
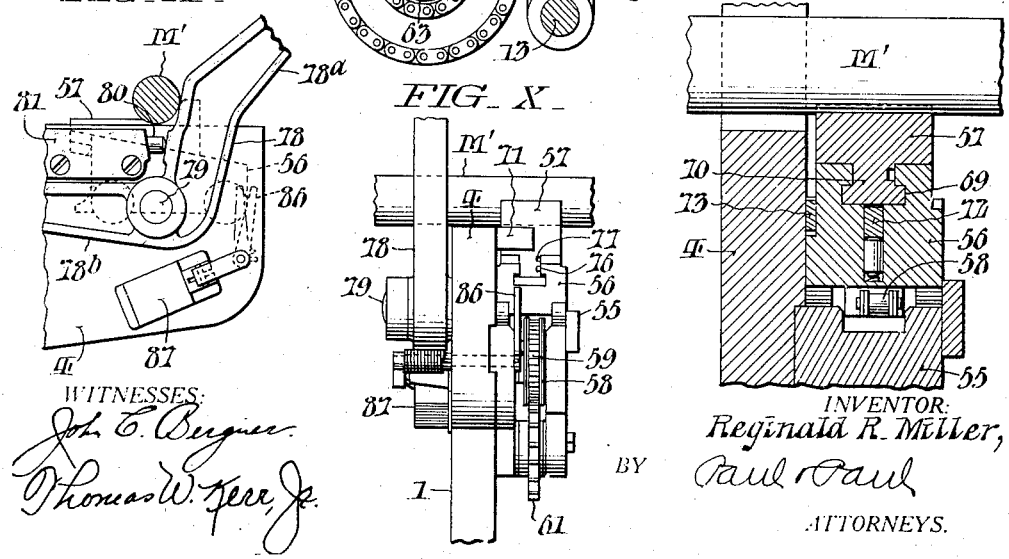

Oct. 7, 1941.   R. R. MILLER   2,258,298
PAPER REPLENISHING MECHANISM FOR ROTARY PRINTING PRESSES
Filed Feb. 1, 1938   31 Sheets-Sheet 9
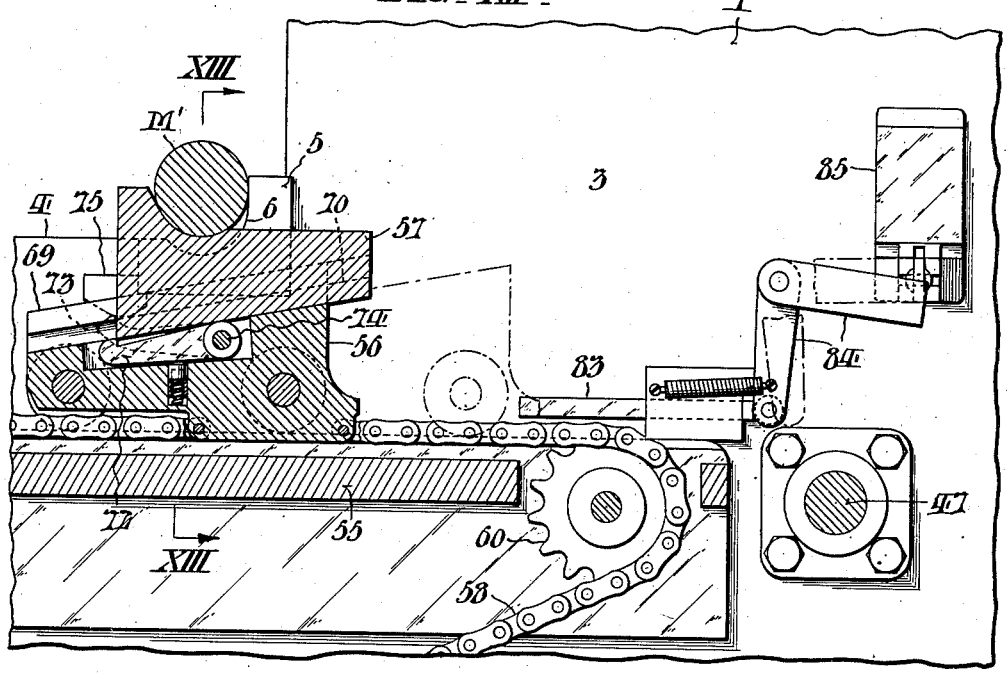
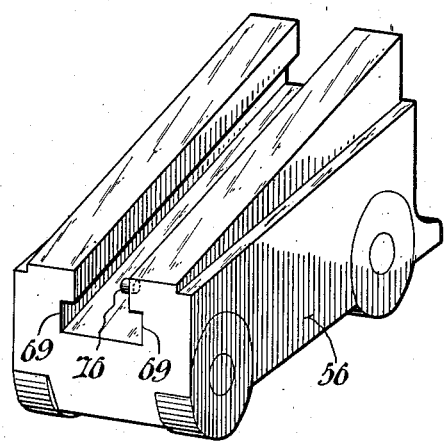
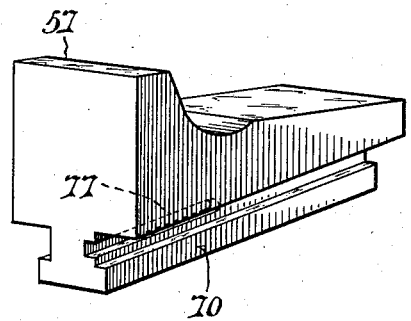
INVENTOR:
Reginald R. Miller,
BY
ATTORNEYS.

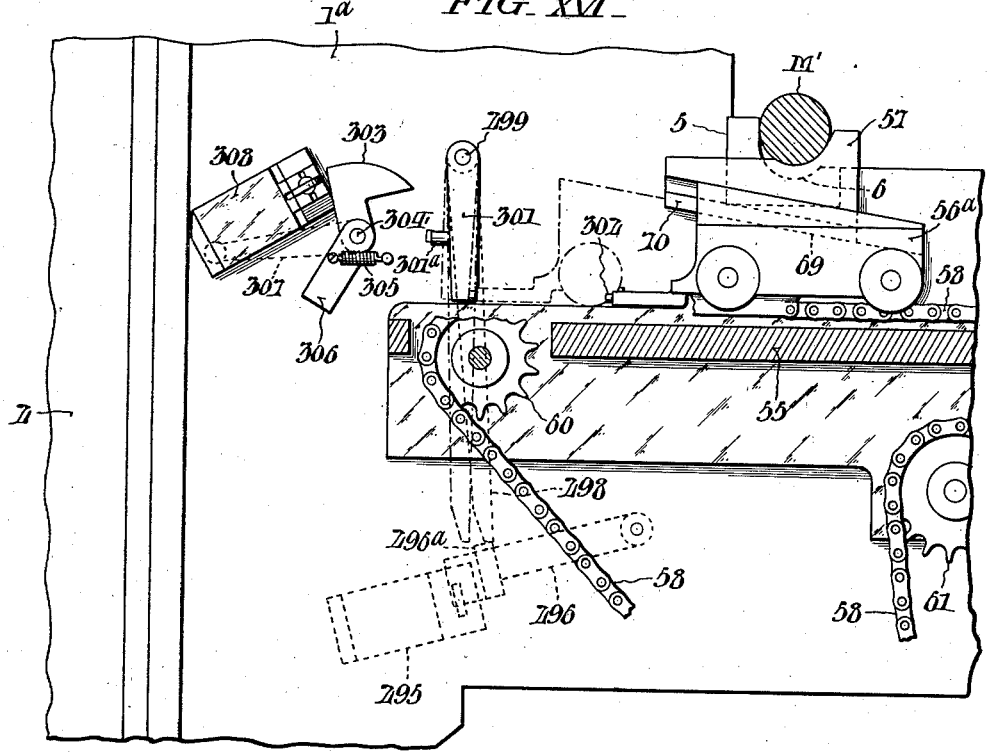
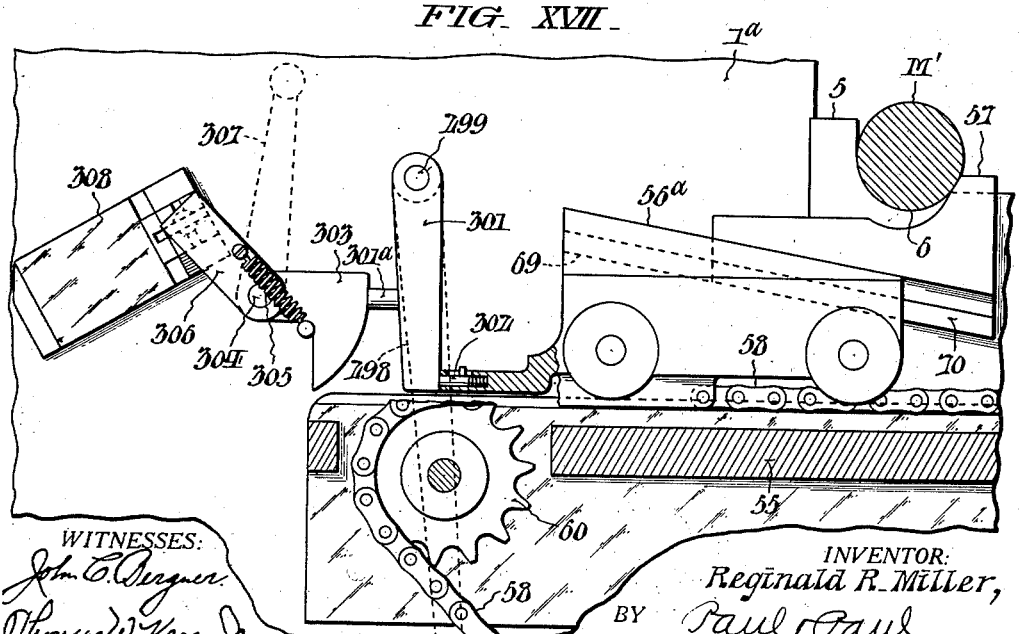

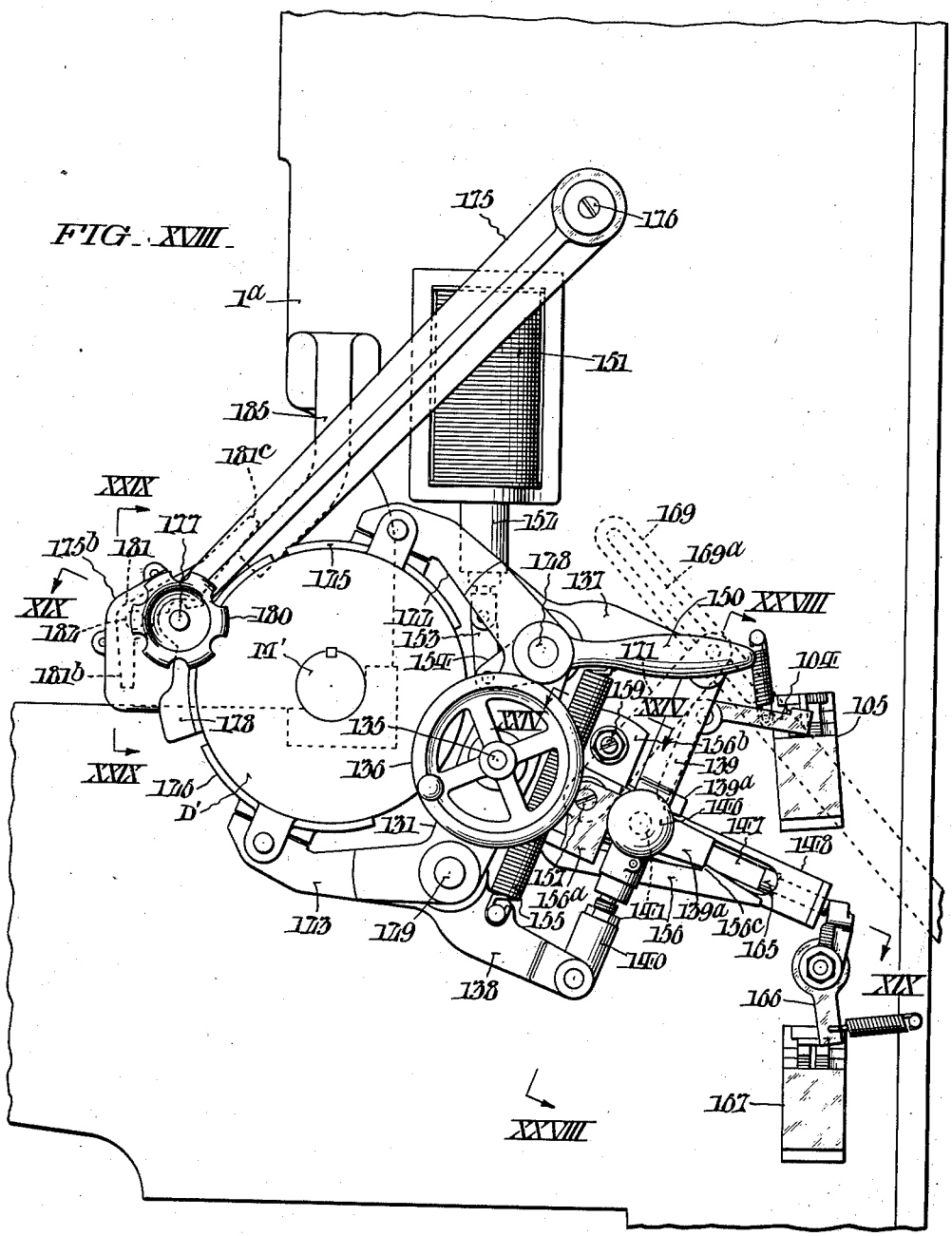

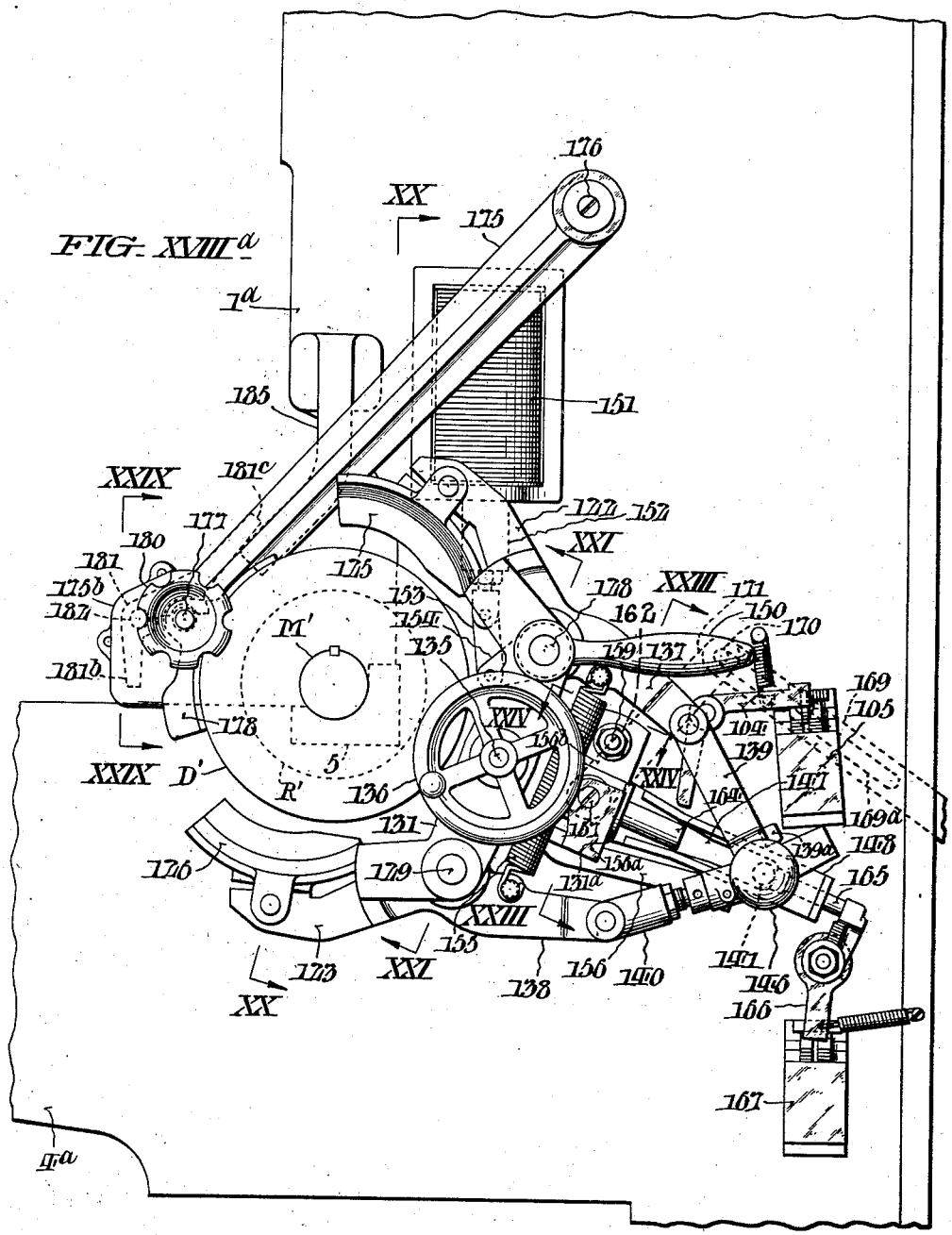

Oct. 7, 1941.  R. R. MILLER  2,258,298
PAPER REPLENISHING MECHANISM FOR ROTARY PRINTING PRESSES
Filed Feb. 1, 1938  31 Sheets-Sheet 13
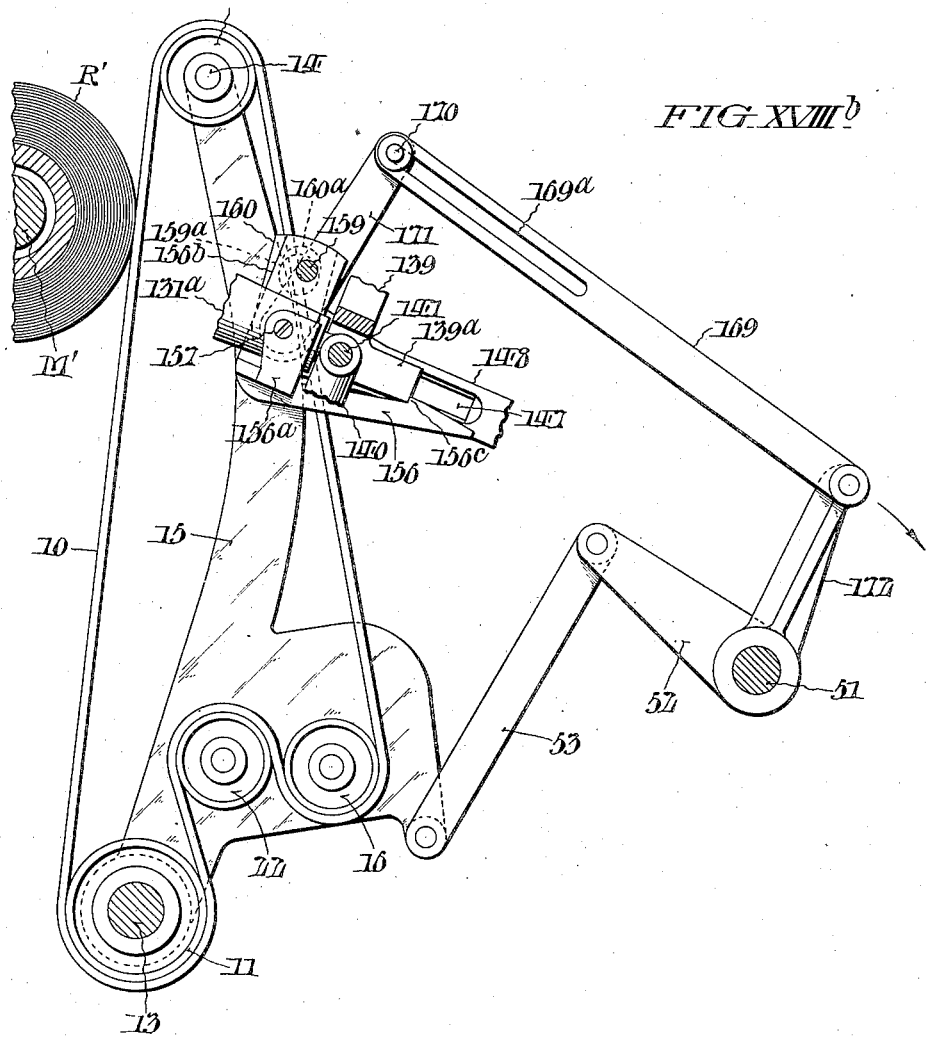
FIG-XVIIIᵇ
WITNESSES:
John C. Bergner
Thomas W. Kerr, Jr.
INVENTOR:
Reginald R. Miller,
BY Paul & Paul
ATTORNEYS.

Oct. 7, 1941.  R. R. MILLER  2,258,298
PAPER REPLENISHING MECHANISM FOR ROTARY PRINTING PRESSES
Filed Feb. 1, 1938  31 Sheets-Sheet 14
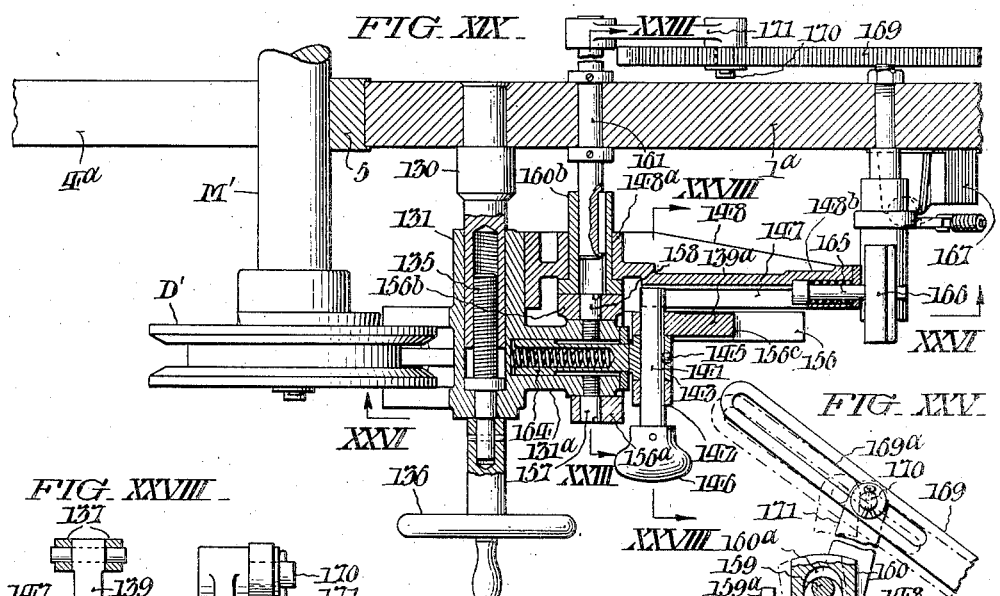
INVENTOR:
Reginald R. Miller,
BY Paul & Paul
ATTORNEYS.

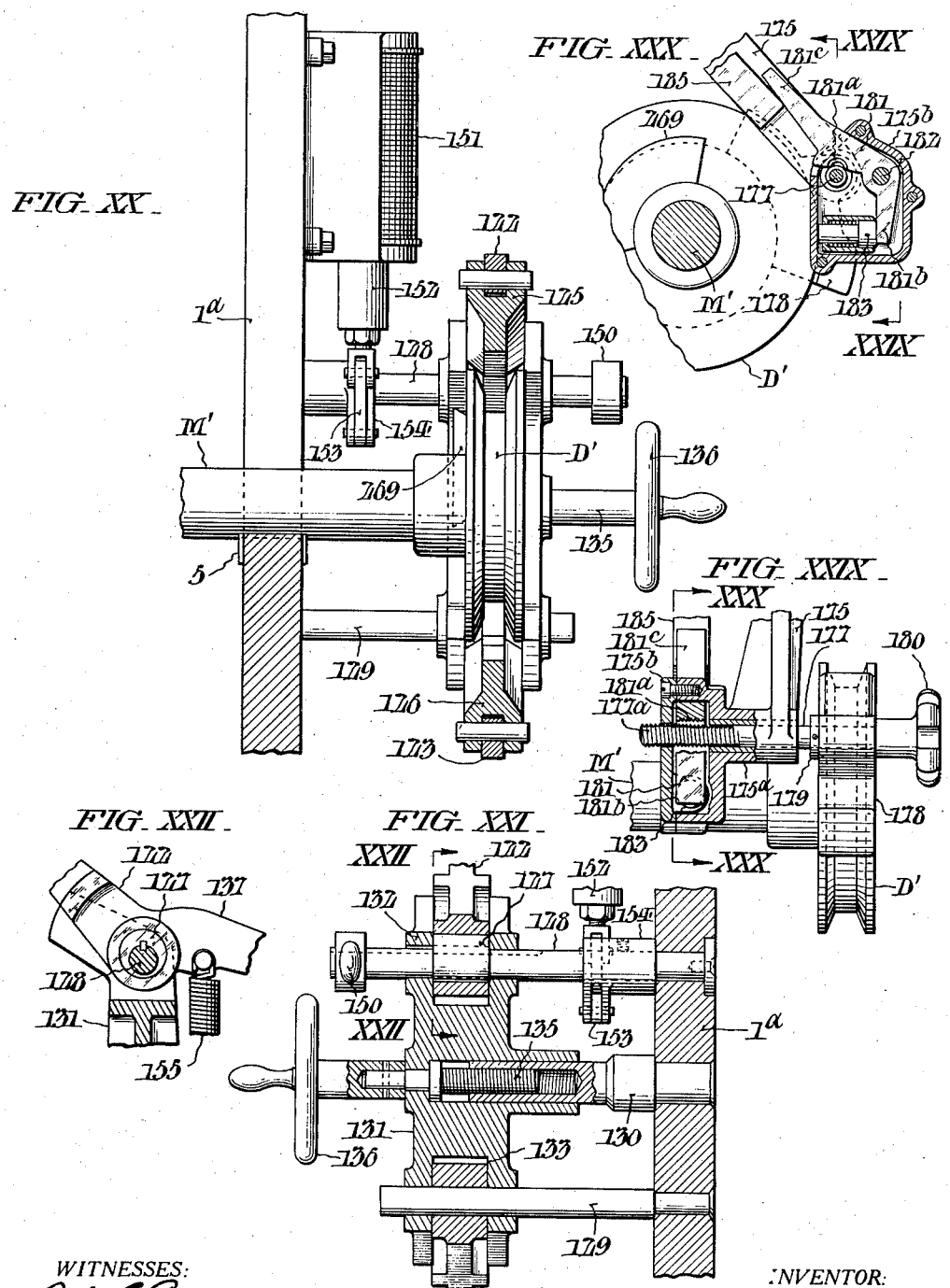

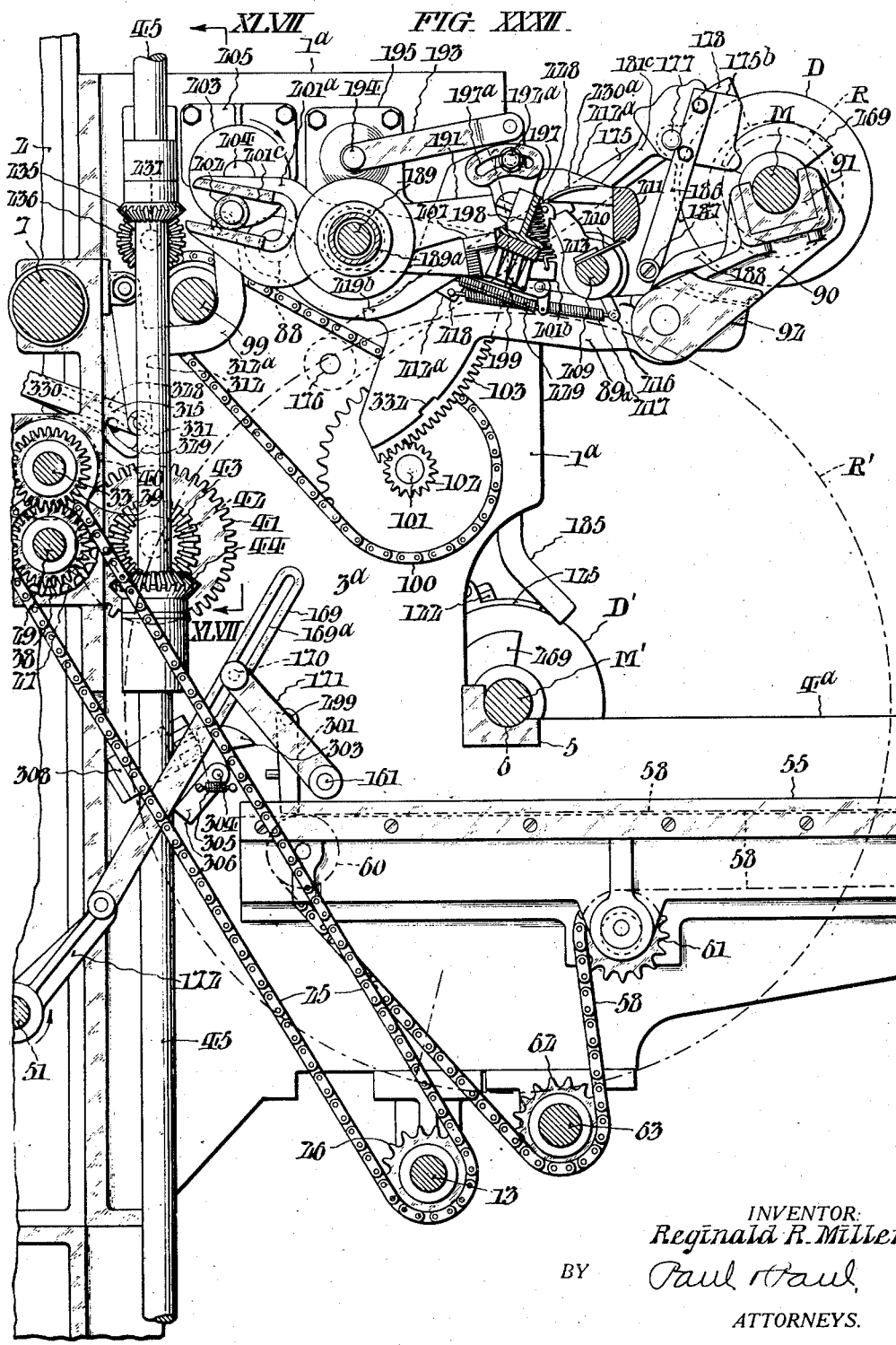

Oct. 7, 1941.    R. R. MILLER    2,258,298
PAPER REPLENISHING MECHANISM FOR ROTARY PRINTING PRESSES
Filed Feb. 1, 1938    31 Sheets-Sheet 17

FIG. XXXII.

INVENTOR:
Reginald R. Miller,
BY Paul & Paul
ATTORNEYS.

WITNESSES:
John C. Beyner
Thomas W. Kerr, Jr.

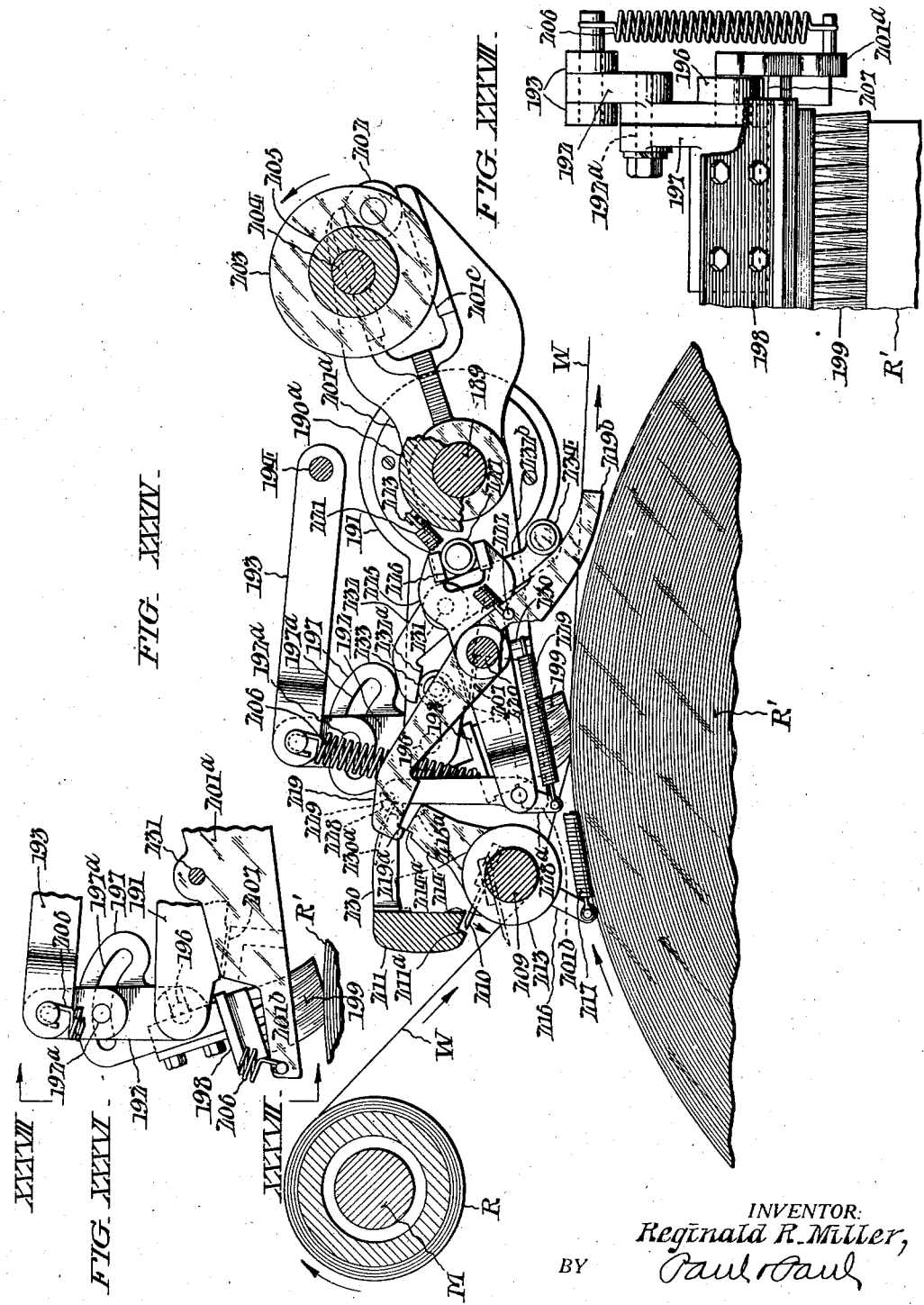

Oct. 7, 1941.　　　　R. R. MILLER　　　　2,258,298
PAPER REPLENISHING MECHANISM FOR ROTARY PRINTING PRESSES
Filed Feb. 1, 1938　　　31 Sheets-Sheet 19
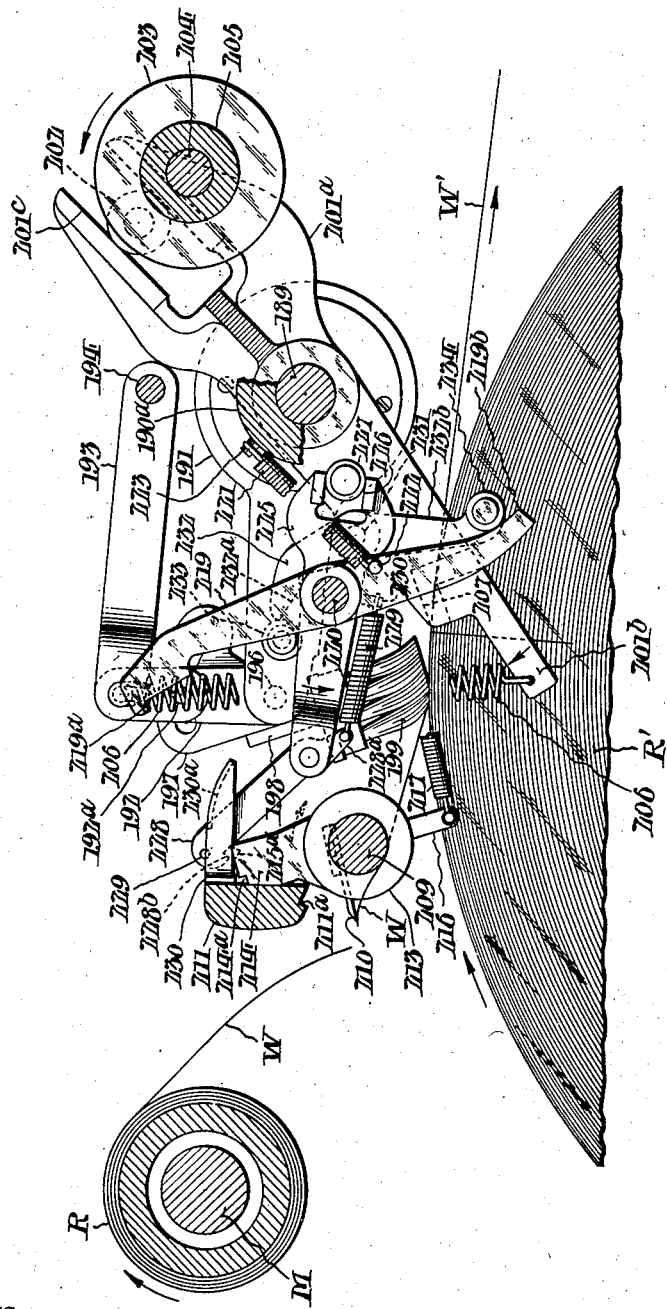
INVENTOR:
Reginald R. Miller,
BY
ATTORNEYS.

Oct. 7, 1941.  R. R. MILLER  2,258,298
PAPER REPLENISHING MECHANISM FOR ROTARY PRINTING PRESSES
Filed Feb. 1, 1938  31 Sheets-Sheet 20
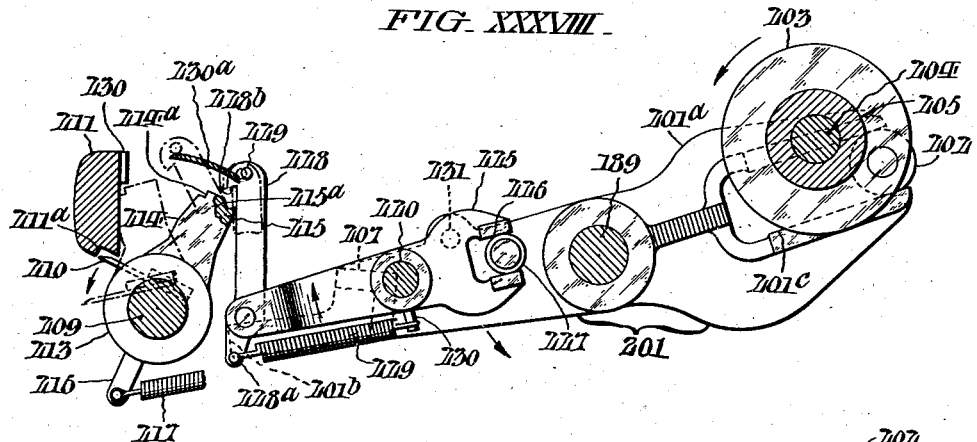
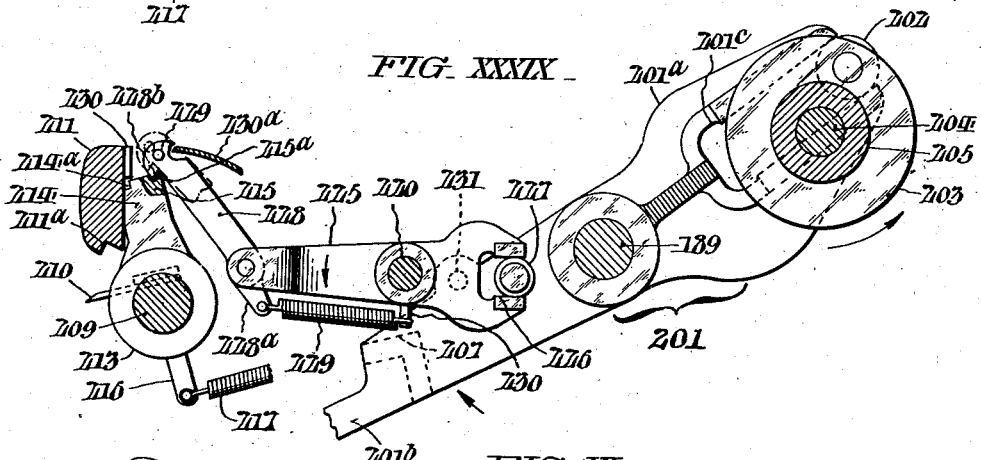
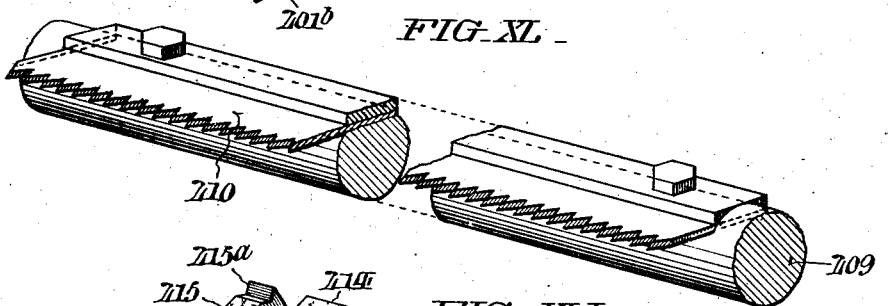
WITNESSES:
John C. Bergner
Thomas W. Kerr, Jr.
INVENTOR:
Reginald R. Miller,
BY Paul & Paul
ATTORNEYS.

Oct. 7, 1941.  R. R. MILLER  2,258,298
PAPER REPLENISHING MECHANISM FOR ROTARY PRINTING PRESSES
Filed Feb. 1, 1938   31 Sheets-Sheet 21
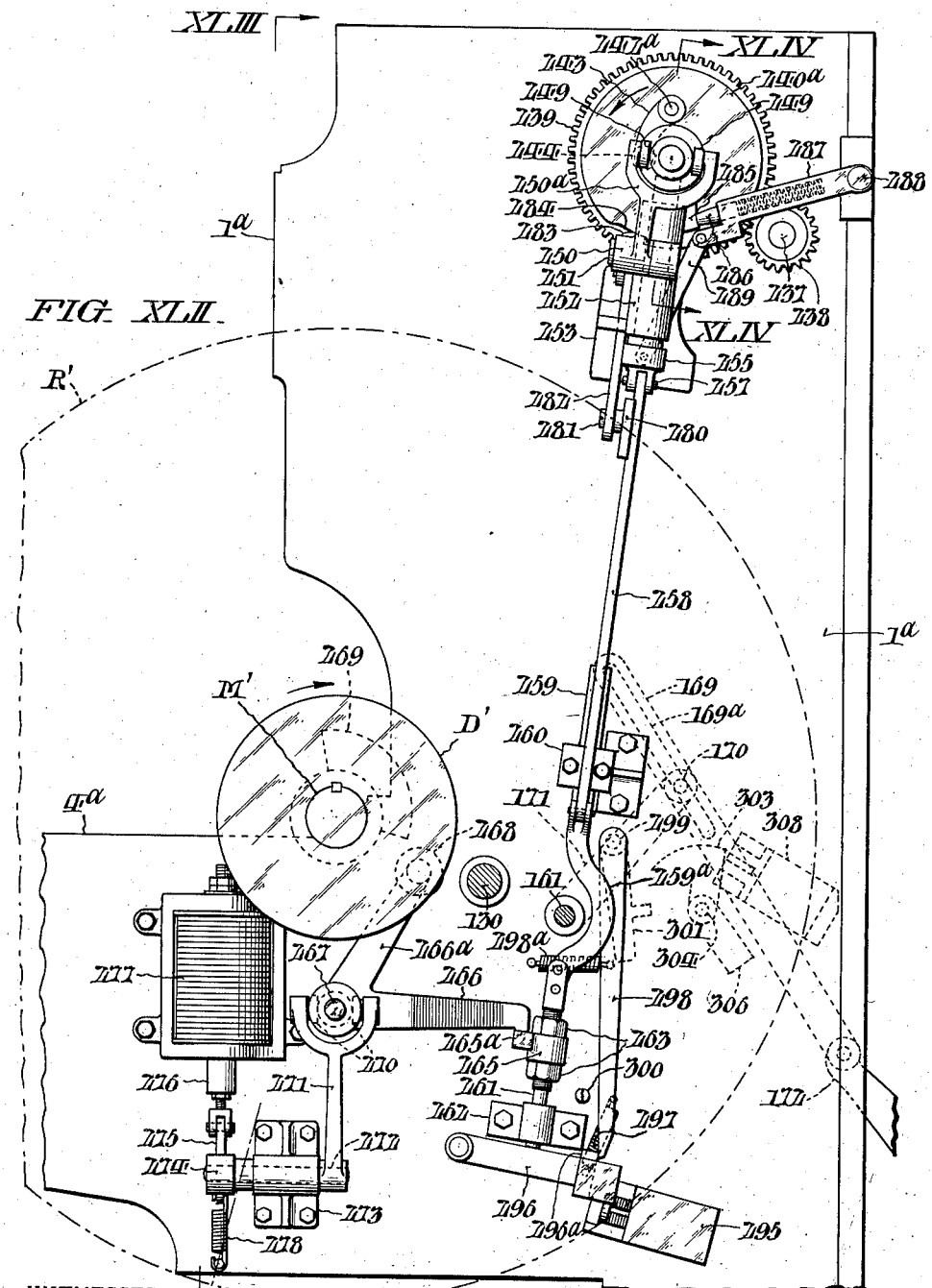

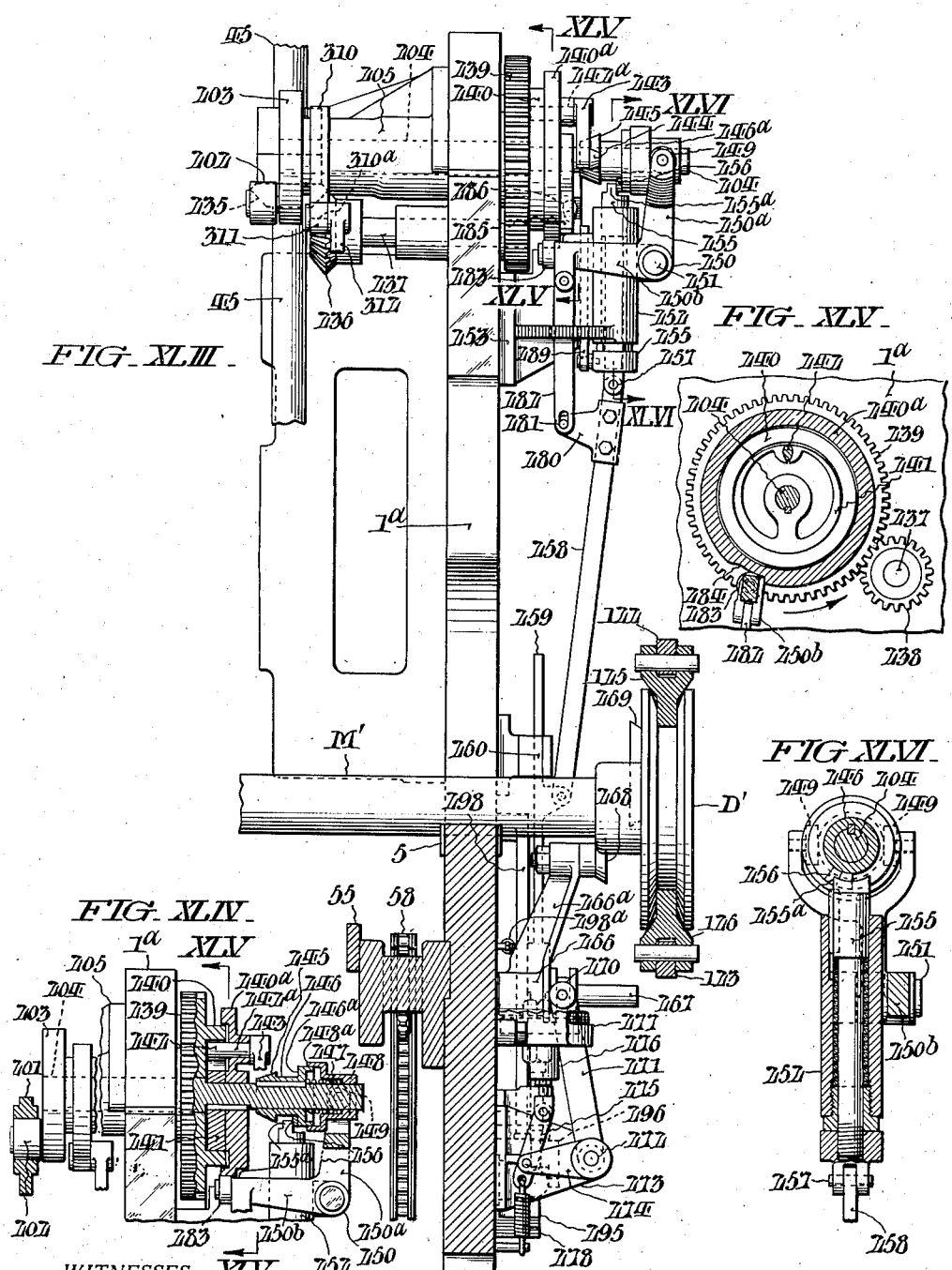

Oct. 7, 1941.    R. R. MILLER    2,258,298
PAPER REPLENISHING MECHANISM FOR ROTARY PRINTING PRESSES
Filed Feb. 1, 1938    31 Sheets-Sheet 23
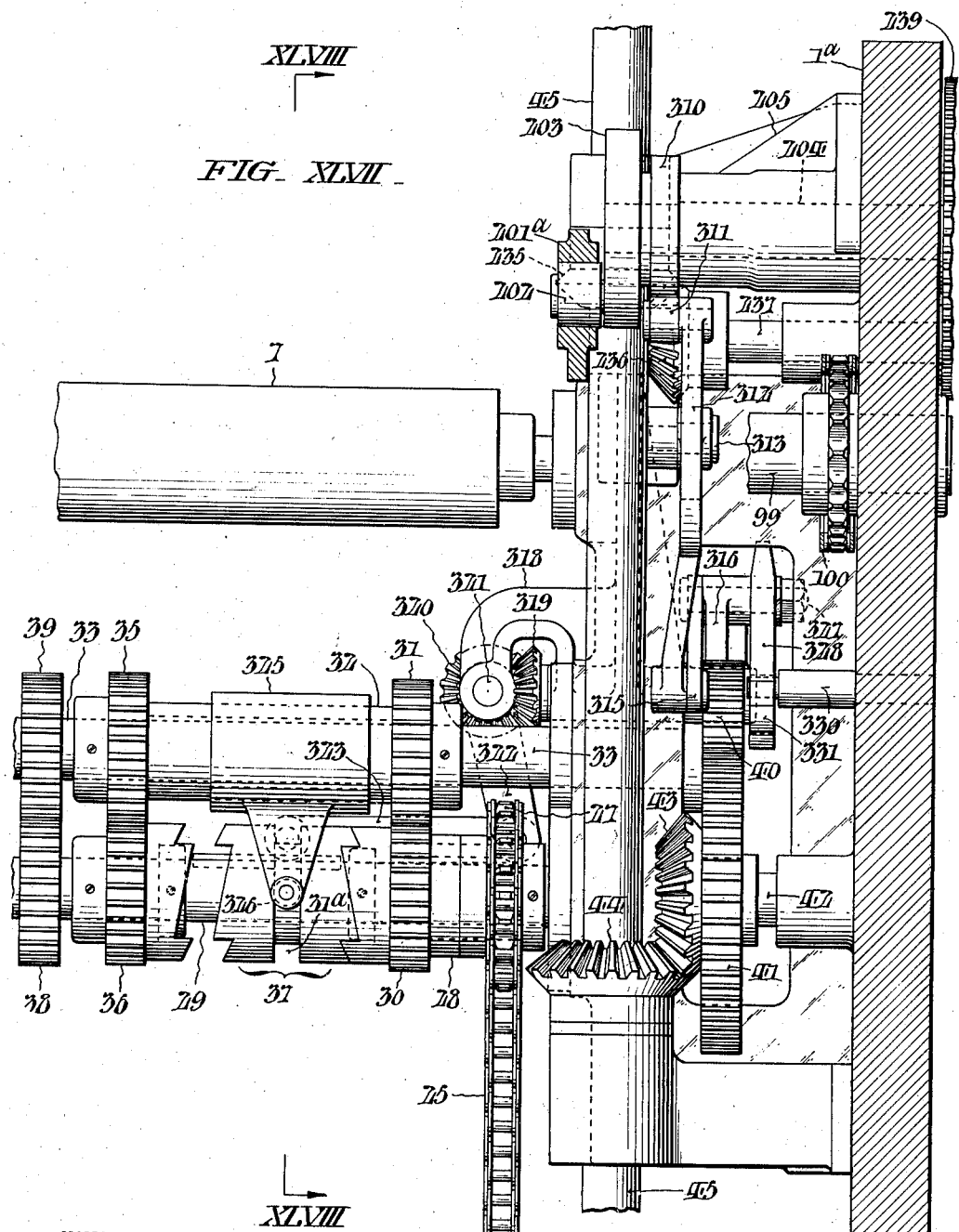
INVENTOR:
Reginald R. Miller, Oct. 7, 1941.  R. R. MILLER  2,258,298
PAPER REPLENISHING MECHANISM FOR ROTARY PRINTING PRESSES
Filed Feb. 1, 1938  31 Sheets-Sheet 24
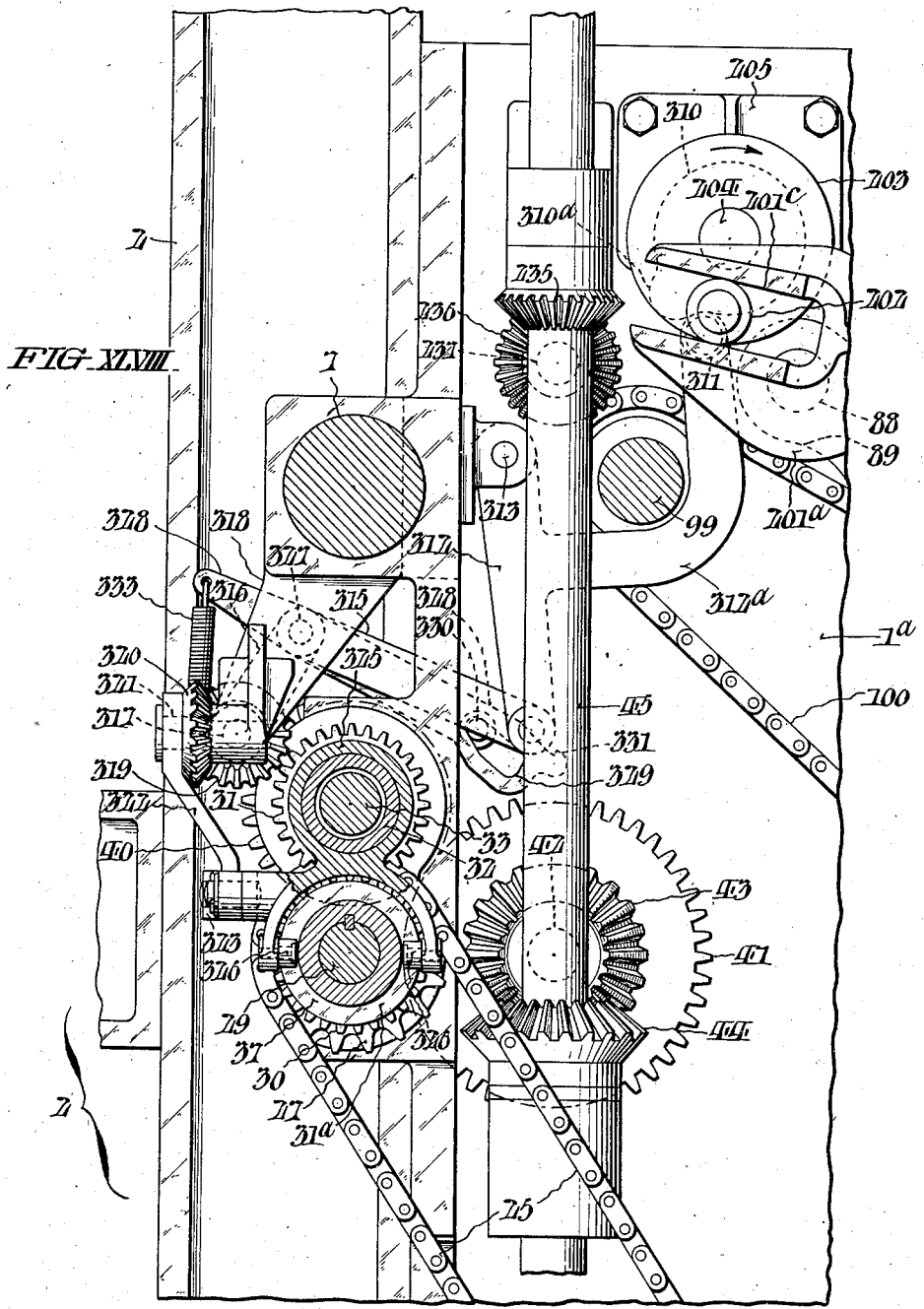
WITNESSES:
INVENTOR:
Reginald R. Miller
BY
ATTORNEYS.

Oct. 7, 1941.   R. R. MILLER   2,258,298
PAPER REPLENISHING MECHANISM FOR ROTARY PRINTING PRESSES
Filed Feb. 1, 1938   31 Sheets-Sheet 25
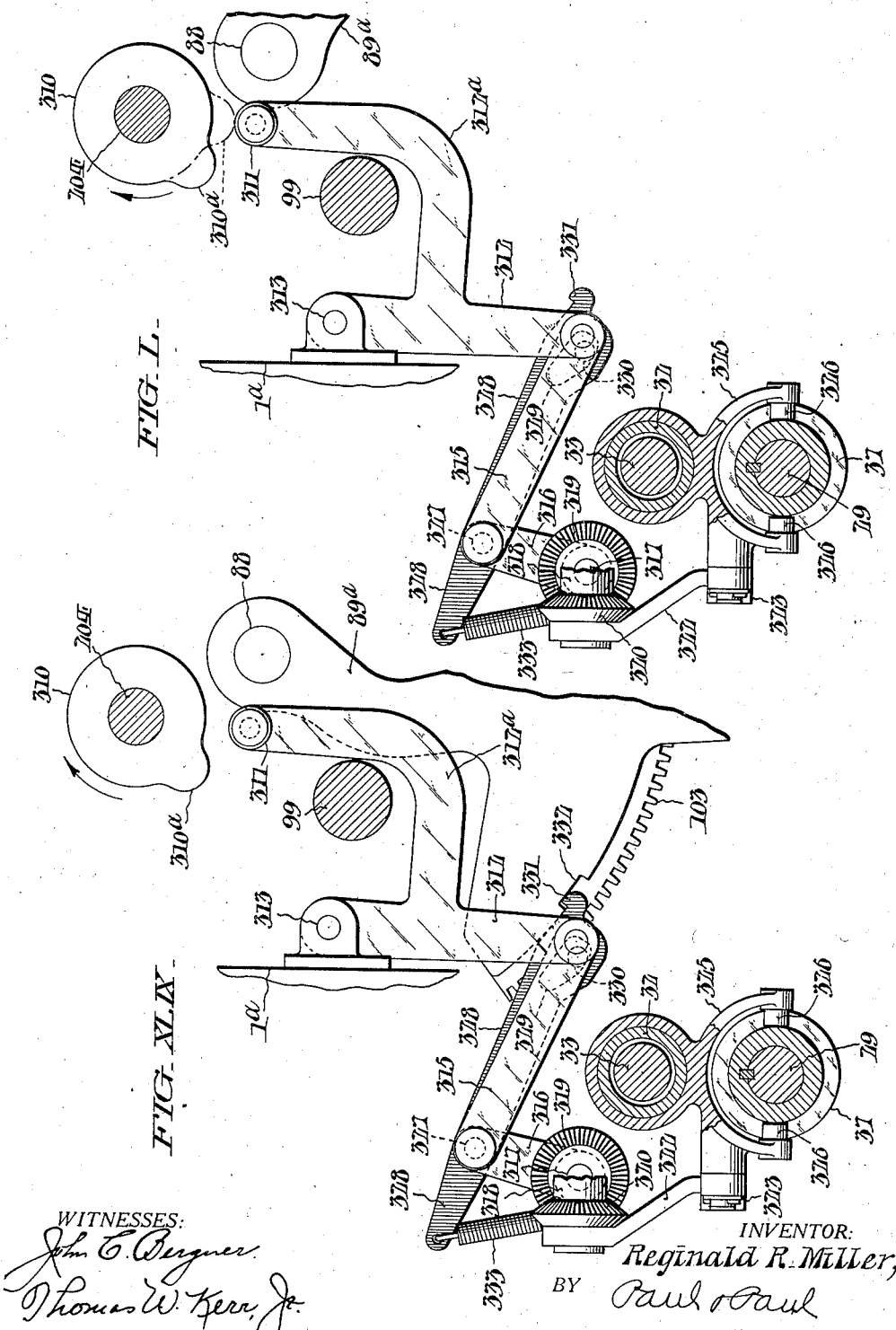
WITNESSES:
INVENTOR:
Reginald R. Miller,
BY
Paul o Paul
ATTORNEYS.

Oct. 7, 1941.  R. R. MILLER  2,258,298
PAPER REPLENISHING MECHANISM FOR ROTARY PRINTING PRESSES
Filed Feb. 1, 1938  31 Sheets-Sheet 26
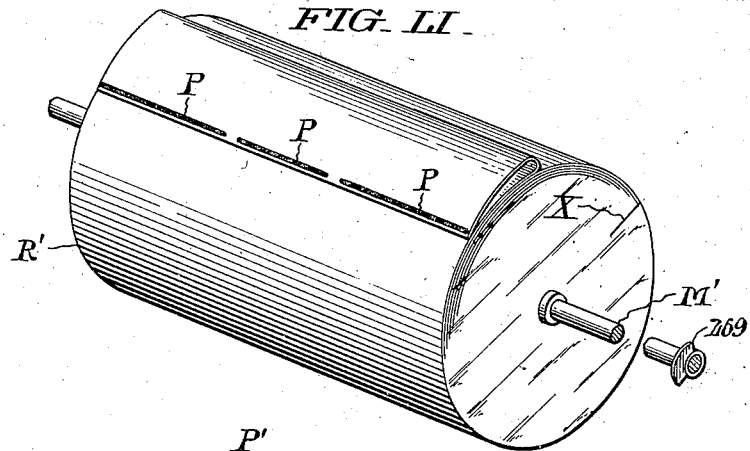
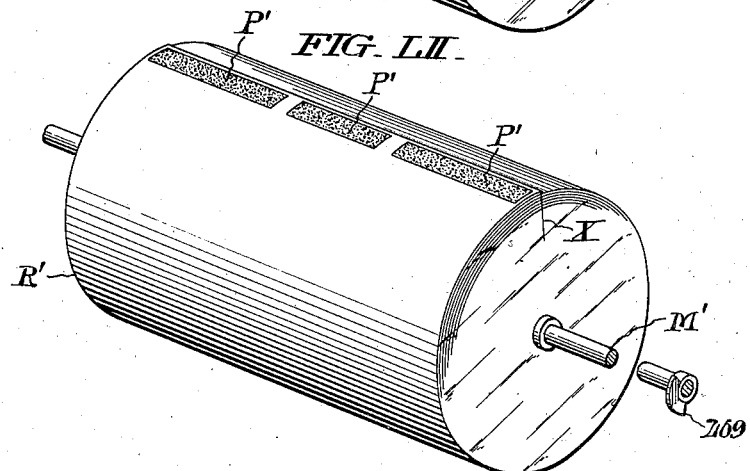
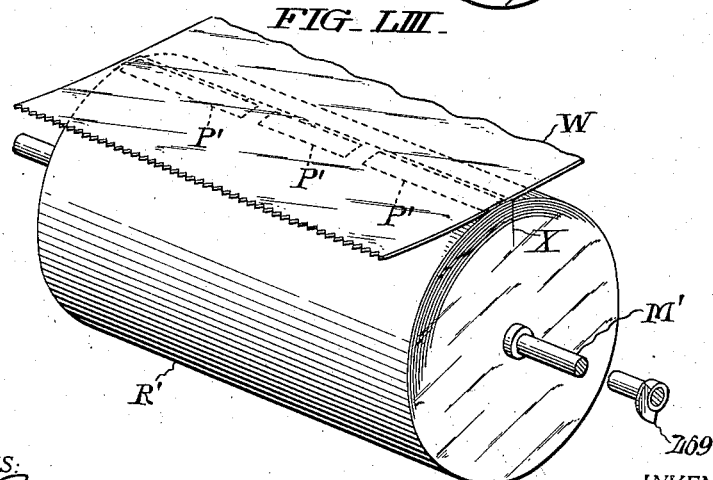
WITNESSES:
John E. Bergner.
Thomas W. Kerr, Jr.
INVENTOR:
Reginald R. Miller,
BY Paul & Paul
ATTORNEYS.

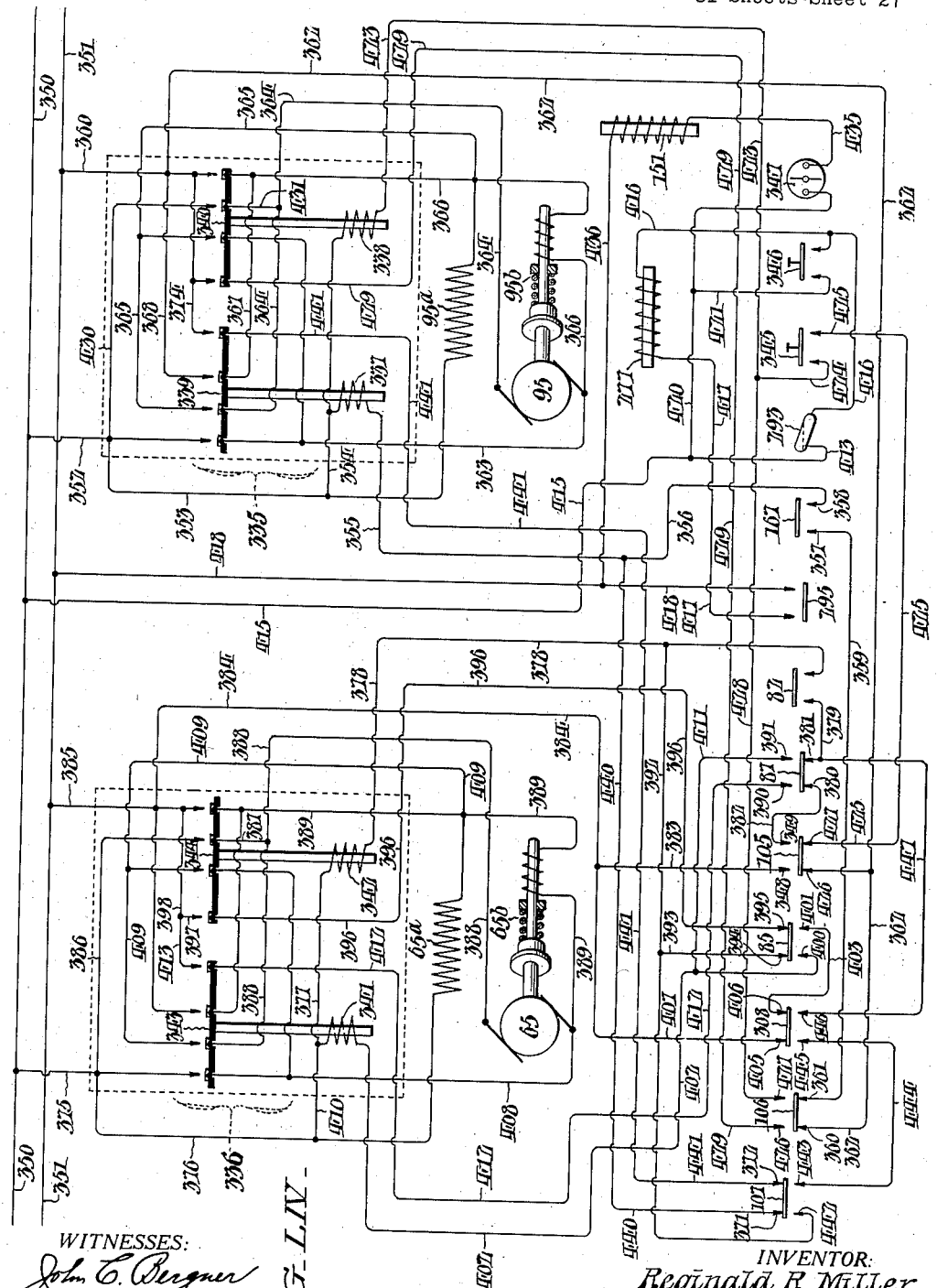

Oct. 7, 1941.　　　　　R. R. MILLER　　　　　2,258,298
PAPER REPLENISHING MECHANISM FOR ROTARY PRINTING PRESSES
Filed Feb. 1, 1938　　　31 Sheets-Sheet 28
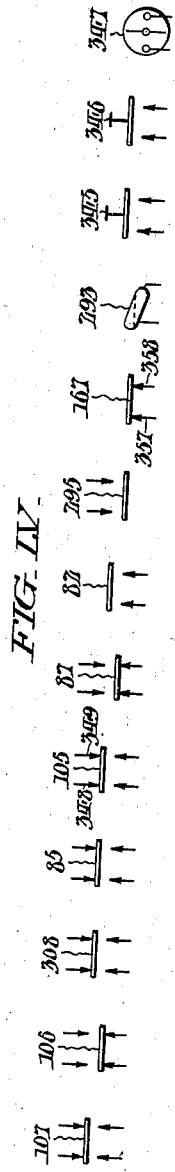
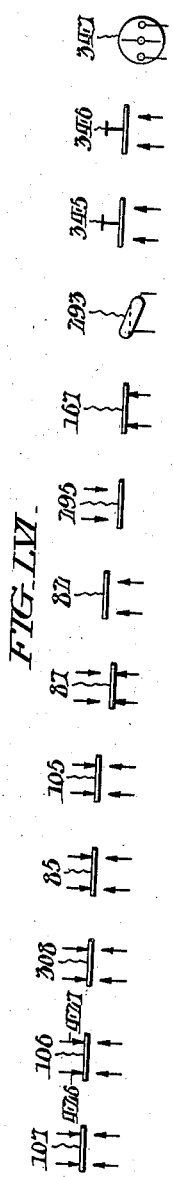
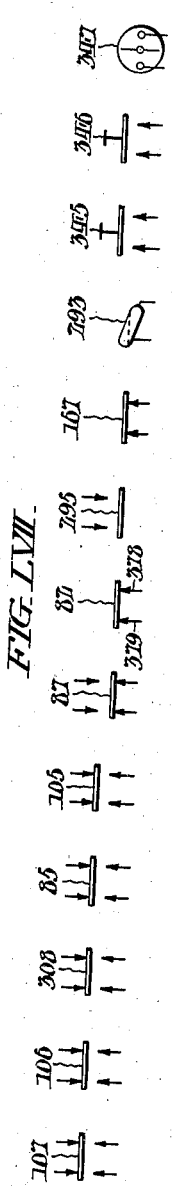
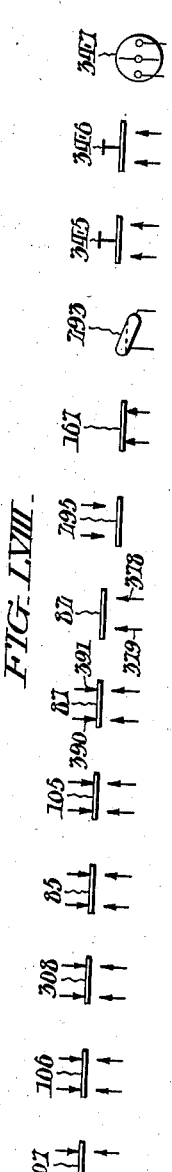
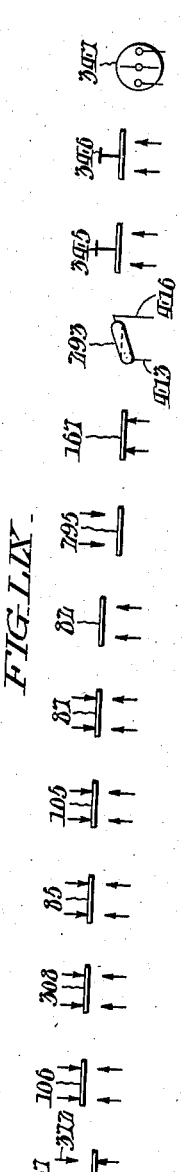
INVENTOR:
Reginald R. Miller, Oct. 7, 1941.    R. R. MILLER    2,258,298
PAPER REPLENISHING MECHANISM FOR ROTARY PRINTING PRESSES
Filed Feb. 1, 1938    31 Sheets-Sheet 29
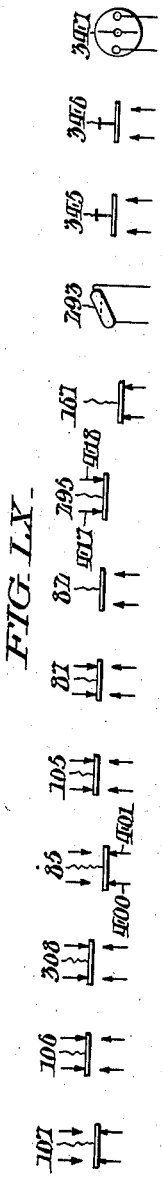
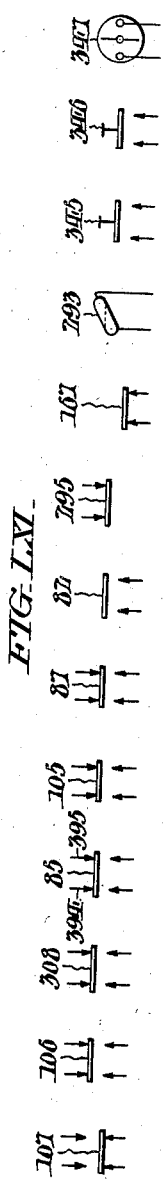
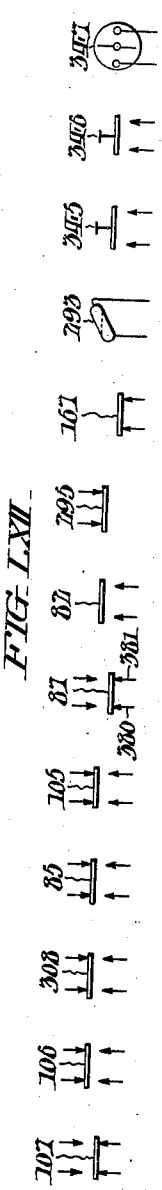
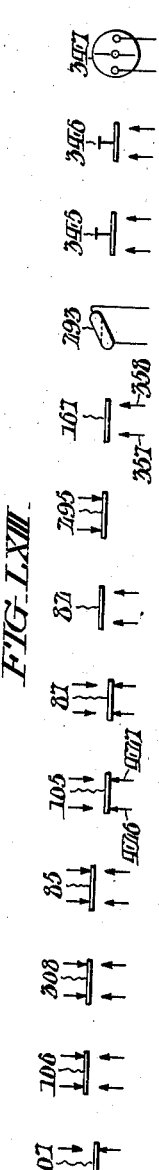
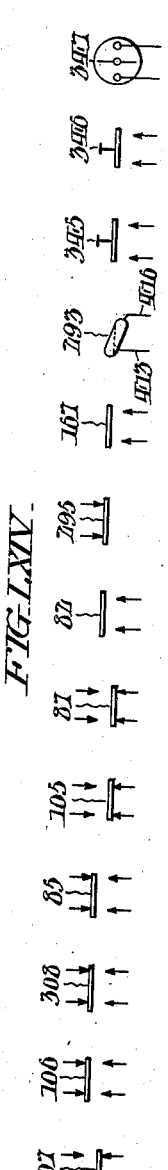
WITNESSES:
John C. Bergner
Thomas W. Kerr Jr.
INVENTOR:
Reginald R. Miller
BY Paul Paul
ATTORNEYS.

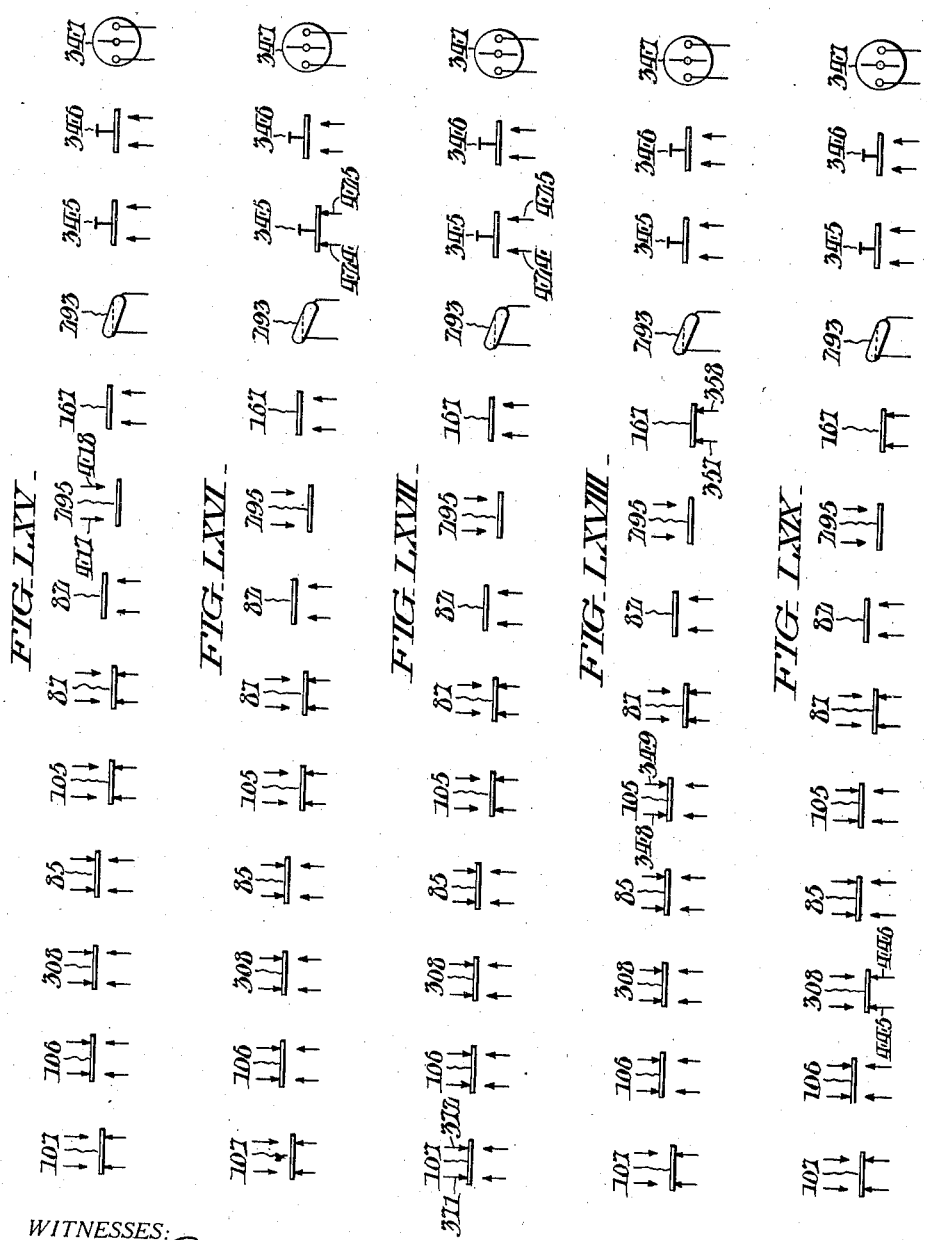

Oct. 7, 1941.  R. R. MILLER  2,258,298
PAPER REPLENISHING MECHANISM FOR ROTARY PRINTING PRESSES
Filed Feb. 1, 1938   31 Sheets-Sheet 31
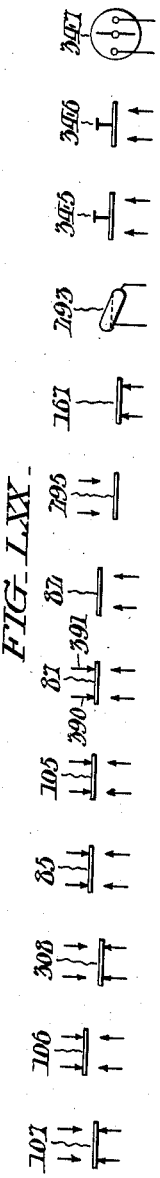
FIG. LXX.
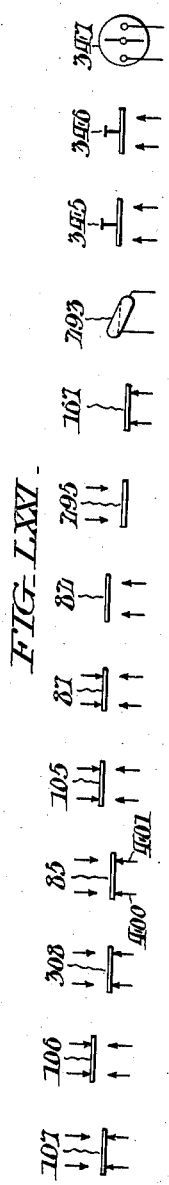
FIG. LXXI.
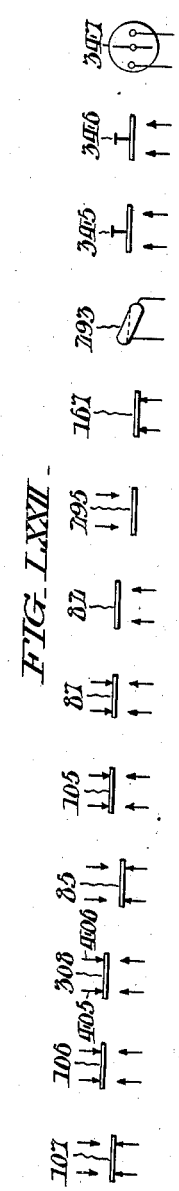
FIG. LXXII.
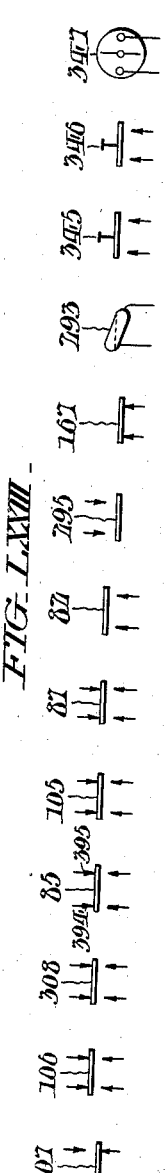
FIG. LXXIII.
WITNESSES:
John E. Bergner
Thomas W. Kerr, Jr.
INVENTOR:
Reginald R. Miller,
BY Paul Paul
ATTORNEYS.

Patented Oct. 7, 1941

2,258,298

UNITED STATES PATENT OFFICE 2,258,298

PAPER REPLENISHING MECHANISM FOR ROTARY PRINTING PRESSES

Reginald R. Miller, Philadelphia, Pa., assignor to William F. Fischer, Philadelphia, Pa.

Application February 1, 1938, Serial No. 188,204

46 Claims. (Cl. 242—58)

This invention relates to mechanism for replenishing paper in rotary presses such as are commonly used in printing newspapers and the like. More especially, the present invention has reference to replenishing mechanism of the type disclosed in U. S. Patent No. 2,005,037, granted to R. Johancen et al., on June 18, 1935, wherein there is a marginal control means for holding the running roll against axial shifting; a means for lifting the running paper roll, upon nearing exhaustion, from a normal position to a higher level in the press; a means for horizontally advancing a new paper roll beneath the elevated expiring roll in readiness to be substituted; a pivotally supported follower carrying an endless belt which is adapted to bring the new roll up to the speed of the travel web of the expiring roll; and means after the new roll has been synchronized, for severing the web of the elevated expiring roll and pressing the trailing severed end of said web against the surface of the new roll over an area of the latter to which an adhesive was previously applied.

The chief aim of my invention is to render paper replenishing mechanism of the type referred to wholly automatic so that no dependence whatever need be placed upon the skill and judgment of the attendant of the printing press to determine the time when the displacement of the expiring roll should be made, or the time when the pasting should be effected, with consequent expedition of the replenishing operation, avoidance of waste of paper, and preclusion of interruptions in the operation of the printing press.

Another object of my invention is to attain the above desideratum by employment of an electric system including a number of switches which are successively operated in a predetermined order to control electric motors and other devices from which the various elements of the mechanism derive their movements.

Another object of my invention is to provide improved means whereby the running web of the exhausted roll is severed with accuracy and precision and connected to the new roll without attendant imposition of strains, such as would be likely to cause rupturing or tearing of the web incident to initiation of this operation.

Another object of my invention is to provide, in connection with paper replenishing mechanism characterized as above, continuously-operative drive means for the belts with a control for determining a normal slow speed for said belts to impose a drag on the running roll and thereby maintaining its web under tension, and for determining a higher speed for said belts during the replenishing cycle so as to synchronize a new roll with the running web of the expiring roll in preparation for the paste.

Another object of my invention is to provide for the retraction of the belts as the new roll is being advanced into position in readiness for substitution, and for gradually moving said belts toward the new roll with attendant gradual increase in pressure and mutual contact so that during the speeding up process, friction and wear occasioned by said belts is distributed over different positions of the roll surface to preclude tearing or "burning" of the web.

Another object of my invention is to provide improved marginal control means capable of being automatically opened during the replenishing cycle for release of the expiring roll and reception of the new substitute roll.

Another object of my invention is to provide improved auxiliary marginal control means for maintaining the web of the expiring roll under tension during and after its elevation.

Other objects and attendant advantages will appear from the following detailed description of the attached drawings, wherein—

Fig. I is a fragmentary view, in side elevation, of a printing press with paper replenishing mechanism conveniently embodying my invention.

Fig. II is a similar view of the opposite side of the press.

Fig. III is a fragmentary view showing the press and the replenishing mechanism in plan.

Fig. IIIa is a fragmentary view of a portion of the replenishing mechanism in plan drawn to a larger scale.

Fig. IV is a longitudinal sectional view of the mechanism taken as indicated by the arrows IV—IV in Fig. III.

Fig. V is a transverse sectional view taken as indicated by the arrows V—V in Fig. I.

Fig. VI is a view corresponding to Fig. IV showing the running paper roll substantially exhausted and about to be elevated.

Fig. VII is a similar view showing the running paper roll elevated and a new paper roll being advanced into normal running position.

Fig. VIII is a longitudinal detail plan sectional view taken as indicated by the arrows VIII—VIII in Fig. IV.

Fig. IX is a fragmentary view looking as indicated by the arrows IX—IX in Figs. III and VIII.

Fig. X is a fragmentary detail view looking as indicated by the arrows X—X in Fig. IX, Fig. XI is a fragmentary longitudinal sectional view taken as indicated by the arrows XI—XI in Fig. VIII and showing the transfer carriage and the actuating mechanism therefor at one side of the mechanism.

Fig. XII is a view corresponding to Fig. IX with the transfer carriages in longitudinal section and differently positioned.

Fig. XIII is a detail sectional view taken as indicated by the arrows XIII—XIII in Fig. XII.

Fig. XIV is a perspective view of the transfer carriage shown in Figs. XI and XII.

Fig. XV is a similar view of a movable bearing block associated with the carriage.

Fig. XVI is a fragmentary longitudinal sectional view showing the transfer carriage at the opposite side of the machine.

Fig. XVII is a view corresponding to Fig. XVI with the carriage in a different position.

Fig. XVIII is a fragmentary view in side elevation corresponding to Fig. I but on a larger scale, showing the main marginal control in its normal closed position.

Fig. XVIIIa is a view like Fig. XVIII, but with the marginal control opened.

Fig. XVIIIb is a skeletonized diagrammatic view of the means by which the automatic replenishing cycle of the mechanism is initiated.

Fig. XIX is a detail sectional view taken as indicated by the arrows XIX—XIX in Fig. XVIII.

Fig. XX is a detail sectional view taken as indicated by the arrows XX—XX in Fig. XVIIIa.

Fig. XXI is a detail sectional view taken as indicated by the arrows XXI—XXI in Fig. XVIIIa.

Fig. XXII is a fragmentary detail sectional view taken as indicated by the arrows XXII—XXII in Fig. XXI.

Fig. XXIII is a fragmentary detail sectional view taken as indicated by the arrows XXIII—XXIII in Figs. XVIIIa and XIX.

Fig. XXIV is a detail sectional view taken as indicated by the arrows XXIV—XXIV in Fig. XVIIIa.

Fig. XXV is a detail sectional view taken as indicated by the arrows XXV—XXV in Fig. XXIII.

Fig. XXVI is a detail sectional view taken as indicated by the arrows XXVI—XXVI in Fig. XIX.

Fig. XXVII is a detail view corresponding to Fig. XXVI with the parts in a different position.

Fig. XXVIII is a detail sectional view taken as indicated by the arrows XXVIII—XXVIII in Figs. XVIII and XIX.

Fig. XXIX is a detail sectional view taken as indicated by the arrows XXIX—XXIX in Figs. XVIIIa and XXX.

Fig. XXX is a detail sectional view taken as indicated by the arrows XXX—XXX in Fig. XXIX.

Fig. XXXI is a fragmentary longitudinal sectional view of the replenishing mechanism taken as indicated by the arrows XXXI—XXXI in Fig. III.

Fig. XXXII is a similar view looking as indicated by the arrows XXXII—XXXII in Fig. III.

Fig. XXXIII is a detail sectional view in longitudinal section of the means for severing the running web from the exhausting roll and connecting it to the new substitute roll, the section being taken as indicated by the arrows XXXIII—XXXIII in Fig. IIIa.

Figs. XXXIV and XXXV are views corresponding to Fig. XXXIII, showing parts of the severing and connecting means in different sequential positions.

Fig. XXXVI is a fragmentary sectional view taken as indicated by the arrows XXXVI—XXXVI in Fig. IIIa.

Fig. XXXVII is a fragmentary detail view looking as indicated by the arrows XXXVII—XXXVII in Fig. XXXVI.

Fig. XXXVIII is a sectional view taken as indicated by the arrows XXXVIII—XXXVIII in Fig. IIIa, with the illustrated parts of the severing and connecting means in the same position as they occupy in Fig. XXXIV.

Fig. XXXIX is a view like Fig. XXXVIII with the parts positioned substantially as in Fig. XXXV.

Fig. XL is a broken out perspective view of the cutting element of the severing means.

Fig. XLI is a perspective view of one of the component parts of the severing means.

Fig. XLII is a side elevation of the replenishing mechanism corresponding to Fig. I, but with the marginal control means removed, and looking as indicated by the arrows XLII—XLII in Fig. III.

Fig. XLIII is a detail sectional view, taken as indicated by the arrows XLIII—XLIII in Fig. XLII.

Fig. XLIV is a detail view partly in elevation and partly in section, taken as indicated by the arrows XLIV—XLIV in Fig. XLII.

Figs. XLV and XLVI are detail sectional views, taken as indicated respectively by the arrows XLV—XLV and XLVI—XLVI in Fig. XLIII.

Fig. XLVII is a detail sectional view, taken as indicated by the arrows XLVII—XLVII in Fig. XXXII.

Fig. XLVIII is a detail sectional view corresponding to Fig. XXXII, and taken as indicated by the arrows XLVIII—XLVIII in Fig. XLVII.

Fig. XLIX is a detail sectional view corresponding to Fig. XLVIII drawn to a larger scale and with certain of the parts differently positioned.

Fig. L is a view like Fig. XLIX with the parts in still another position.

Figs. LI and LII are perspective views showing successive steps by which a new paper roll is prepared for substitution and connection to the expiring roll in the press.

Fig. LIII is a perspective view showing how the running end of the severing web of the expired roll is connected to the leading end of the web of the new roll.

Fig. LIV is a wiring diagram of the electrical switches and devices employed to control and operate the replenishing mechanism.

Figs. LV—LXXIII are diagrammatic views showing successive stages in the actuation of the control switches.

With more detailed reference first more particularly to Figs. I—VII of these illustrations, it will be observed that my improved paper replenishing mechanism includes a pair of laterally spaced side frames 1 and 1a which are secured to the framework of a rotary printing press partly shown at 2 at the feed end of the latter. Set into the corner angles between the main portions 3 of the side frames 1, 1a and integrally-formed rearwardly-projecting horizontal bracket arms 4, 4a of said frames, are blocks 5 which are arcuately recessed as at 6 to serve as open-top bearings for the mandrel M of an active or running paper roll R from which the web W being printed is continuously drawn. Enroute from the roll R, the web W passes forwardly to a guide roller 7, then upwardly to a spring influenced tension roller 8, then to another roller 9 at substantially the same level as the roller 7, and from thence horizontally into the printing press.

The active paper roll R is normally contacted by a pair of laterally-spaced endless follower belts 10, which are trained about pulleys 11 and 12 respectively secured on transverse shafts 13 and 14. The lower pulley shaft 13 is journaled at its opposite ends in suitable bearings at the bottoms of the side frames 1, 1a and the upper shaft 14 in suitable bearings at the tops of a pair of arms 15 which, together constitute a frame capable of pivotal movement about said lower shaft. Slack take-up rollers such as shown at 16 in Figs. VI and VII are associated with the respective belts 10, the bearings 17 for said rollers being secured to the lower ends of rods 18 which are slidable up and down in spaced lugs 19, 20 of the corresponding arms 15 and yieldingly urged downwardly by helical springs 21 surrounding said rods. By coaction with idler pulleys 22, the rollers 16 tend to maintain the belts 10 in yielding tension. By means of a chain 25, a sprocket wheel 26 on the shaft 13 is connected to a sprocket wheel 27 on a sleeve 28 (Figs. V, XLVII and XLVIII) freely mounted on a transverse shaft 29 journaled in the frames 1, 1a of the mechanism, said sleeve also having affixed to it a spur gear 30 which meshes with a spur gear 31 of exactly the same size at one end of a sleeve 32 freely mounted on a parallel transverse shaft 33. A spur gear 35 on the other end of the sleeve 32 meshes with a slightly smaller spur gear 36 free on the shaft 29. By means of a longitudinally-slidable splined clutch collar 37, the sleeve 28 carrying the sprocket wheel 27 or the gear wheel 36 may be coupled with the shaft 29 so as to be rotated thereby. Through a pair of intermeshing spur gears 38, 39 of equal diameter, the shaft 29 is directly driven from the shaft 33 which is in turn driven through a pair of intermeshing spur gears 40, 41 from a stub shaft 42. As shown, the shaft 42 receives motion through a pair of intermeshing bevel gears 43, 44 from a constantly rotating vertical shaft 45 driven from the printing press. Normally, the clutch collar 37 is engaged with the gear 36 so that power is delivered from the shaft 29 through the gears 36, 35 to the sleeve 32 and from thence through the gears 31, 30 to said sprocket. Due to the differences in the diameters of the gears 35, 36 under this hookup, the belts 10 are normally driven at a surface speed slightly less than the linear speed of the web W, so that an out drag or tension is normally maintained on said web. During the replenishing cycle of the mechanism as later on explained, the clutch collar 37 is shifted to the position shown in Fig. XLVII so that the sprocket wheel 27 is directly driven at the speed of the shaft 29 and the belts 10 thereby actuated at a slightly faster surface speed than the web W.

The belts 10 are urged toward the running paper roll R under the action of a weighted lever 46 secured at the inner end of a rock shaft 47 which is journaled in the arm 4 of one of the side frames 1. At its inner end, the shaft 47 carries a sprocket wheel 48 which is connected by a chain 49 to a sprocket wheel 50 on a rock shaft 51 journaled in the framework of the replenishing mechanism. Also secured to the rock shaft 51 are crank arms 52, which, by means of links 53 are coupled with the arms 15 of the belt-carrying frames. Thus, under the influence of the weighted lever 46 and the interposed connections just described, the belts 10 are normally maintained in effective pressure contact with the running paper roll R as shown in Fig. IV. If desired or found more convenient, springs or other equivalent means may be substituted for the weighted lever 46.

Confined to horizontal guides or tracks 55 at the inner sides of the bracket arms 4 and 4a are carriages 56, 56a, each of which supports an open-top bearing block 57 which is generally like the fixed bearing blocks 5 but oppositely disposed in relation to the latter. Normally the transfer carriages 56, 56a are positioned at the outer ends of the bracket arms 4, 4a in readiness to receive within the recesses of their bearing blocks 57 as shown in Fig. VI, the ends of the mandrel M' of a new paper roll R' (Fig. VI) which, as later explained, is ultimately substituted in place of the running roll R when the latter is substantially exhausted. As shown, each of the transfer carriages 56, 56a is connected to a chain 58 which passes about a system of sprocket wheels 59, 60, 61, 62 whereof the shafts are suitably journaled in the frames 1 and 1a, the shaft 63 of the sprocket wheel 62 extending crosswise between the bracket arms 4 and 4a as shown in Fig. V. The drive means for the carriages 56, 56a includes a normally quiescent reversible electric motor 65 with an inbuilt speed reducing unit 66 which is secured to one of the side frames 1, the delivery shaft 67 of said speed reducing unit being connected with the shaft 63 by a sprocket chain 68. As conventionally shown in Fig. LIV, the motor has a shunt field 65a and provided with a magnetic brake 65b. By rotation of the motor 65 in one direction, the carriages 56 are moved from the position shown in Fig. VI, through the position shown in Fig. VII, to that shown in Fig. IV, to deliver the new paper roll R' to the fixed bearing blocks 5, and upon reversal of said motor, the carriages are returned empty to their normal positions at the outer ends of the bracket arms 4 and 4a.

From Figs. IX and XVI, it will be observed that each of the carriages 56, 56a has an undercut longitudinal groove 69 in its top which is inclined somewhat to the horizontal and engaged by a correspondingly configured sloping tongue 70 at the bottom of the associated bearing block 57. As the carriages 56 move toward the outer ends of the arms 4, 4a, the bearing blocks 57 are intercepted by stops 71 on said arms, and through coaction between the inclined surfaces of the grooves and tongues 69 and 70, are elevated slightly as said carriages advance somewhat further as shown in Fig. IX. As a consequence of such actuation by the stops 71, the bearing blocks 57 are raised slightly above the level of the fixed blocks 5, in which position they are locked and normally held by upwardly spring-pressed pivoted latch hooks 72, see Fig. XII. During inward movement of the carriages 56, fingers 73 on the axes 74 of the latch hooks 72 are engaged by fixed cam pieces 75 on the frame 1, 1a with attendant release of the bearing blocks 57 as shown in Fig. XII. Thus as the carriages 56, 56a continue inward slightly further, the blocks 57 recede downwardly as a consequence of coaction between the inclines of the grooves and the tongues 69 and 70, so that the mandrel M' of the new paper roll R' is let down easily and without jar into the recesses 6 of the fixed bearing blocks 5 in a manner readily understood from Fig. XII. Stop pins 76 on the carriages 56, 56a cooperate with grooves 77 in the tongues 70 of the bearing blocks 57 to prevent the latter from slipping entirely off said carriages, see Figs. XIV and XV.

Initial placement of the new paper roll R' is facilitated by a pair of angle guide members 78 which are fulcrumed respectively at 79 on the outer ends of the bracket arms 4, 4a as shown in Figs. I and XI, the upwardly extending inclined arms 78a of said guides serving to direct the mandrel M' of such new roll into the recesses of the carriage bearing blocks 57. By means of spring pressed plungers 80 axially movable in small housings 81 attached to the outer sides of the bracket arms 4, 4a, the guides 78 are normally maintained yieldingly in the position shown in Fig. I with the ends of their horizontal arms 78b in engagement with the rear ends of said housings. As the new roll R' is lifted by a crane (not shown) from the floor level, the guides 78 yield to movement to the dot and dash line position shown in Fig. I when encountered from beneath by the mandrel M' of said new roll. However, when the mandrel M' is elevated to a position above the guides 78, the latter swing back to their normal positions, with attendant movement of their inclined upward arms 78a beneath the mandrel in readiness to direct the latter into the notches of the carriage bearing blocks 57 as above set forth. Inward movement of the carriages 56, 56a is initiated by momentary closing of a switch 82 Fig. XXXI in circuit with the motor 65, said switch being mounted on the side frame 1 and automatically actuated in a manner later on explained. In traveling inward on the bracket arms 4, the carriage 56 ultimately encounters a spring-influenced slide bar 83 operatively connected to the spring pulled actuating bell crank 84 (Fig. XII) of a reversing limit switch 85 secured to the side frame 1 and also connected in circuit with the motor 65. During its outward travel, the carriage 56 ultimately encounters the spring-pulled actuating lever 86 of a limit switch 87 (Fig. XI) on one of the bracket arms 4 whereby the current supply to the motor 65 is automatically shut off, the carriages being thereby restored to their normal positions after having delivered the new paper roll R' to the fixed bearing blocks 5.

Before a new paper roll R' can be substituted for the expiring paper roll R, the latter must be moved out of the fixed bearing blocks 5, which function is accomplished by the means about to be described. Projecting inward from the upper portions of the side frames 1, 1a are studs 88 which serve as fulcrums for elevating levers 89, 89a. Respectively pivoted to the outer ends of these levers 89, 89a are knuckle-jointed arms 90 with open bearings 91 at their swinging ends, said arms resting normally against inwardly projecting lugs 92 at the ends of the levers so as to occupy the positions shown in Figs. IV, XXXI and XXXII relative to said levers. By suitable means presently described, the levers 89, 89a can be lowered from the elevated position shown in Figs. II, IV, XXXI and XXXII, and during such movement, the arms 90 encounter the ends of the mandrel M' of the running paper roll R' previously placed on the carriages 56, 56a being thereby swung upwardly about their pivots until they clear said mandrel as shown in dot and dash lines in Fig. XXXI and finally fall back into their normal relation to the levers. Thus upon subsequent upward movement of the levers 89, 89a, the mandrel M' is engaged within the bearings of the arms and the running roll R' lifted bodily to the position shown in Fig. VII to make room for the new roll which is to be substituted in its place. As shown in Fig. XXXI, the switch 82 hereinbefore referred to is positioned in the path of a radial actuating projection 94 on the hub of the lever 89 so as to be actuated during elevation of the expiring roll R. The means for moving the levers 89, 89a as just explained comprises an electric motor 95 which is secured to the outside of one of the side frames 1, said motor being exactly like the motor 65 in that it has a shunt field 95a, magnetic brake means 95b (Fig. LIV) and in that it is fitted with a speed reducing unit 96 whereof the shaft 97 is connected by sprocket chain 98 to a transverse shaft 99 journaled in said frames 1, 1a. At the insides of the frames 1, 1a, the shaft 99 is connected by means of sprocket chains 100 with stub shafts 101 journaled in said frames. Affixed to the stub shafts 101 are spur gear pinions 102 which mesh with gear sectors 103 on the arms 89, see Figs. XXXI and XXXII. Movements of the shaft 99 are initiated by a control switch 167 in circuit with the motor 95, said switch being secured to one of the side frames 1a as shown in Fig. XVIII, the end of its spring-pulled actuating lever 104 normally engaged by a lateral projection 139a on the toggle link 139 as shown in Fig. XVIII. Also in circuit with the motor 95 are stop and safety switches 106, 107 which are secured to the inside of the frame 1 (see Fig. XXXI), the first mentioned of these switches being operated by a projection 108 on the lever 89, and the other of said switches being operated by a lug 109 on said arm.

At the time the new paper roll R' is moved inward to active position, the frame 15 carrying the follower belts 10 is retracted, i. e., swung to the right about the shaft 13. The means for accomplishing this includes a spiral-edged cam disk 110 (see Fig. IX) which is free on a stud 111 projecting outwardly from the side frame 1. The cam 110 is actuated through a pair of intermeshing spur gears 112, 113, whereof the latter is free on another stud 115 on the frame and has attached to it a sprocket wheel 116 that meshes with one of the carriage actuating chains 58, the ratio of the above gearing being such that the cam disk is caused to oscillate approximately through a three-quarters revolution from the normal position in which it is shown in Fig. IX in the direction of the arrow. The disk cam 110 acts upon a roller 117 carried by an inclined link 118 which is bifurcated at its lower end as at 119 for sliding engagement with a circumferentially grooved collar 120 on the stud 111. At its upper end, the link 118 is pivotally connected to an arm 121 affixed to the shaft 47. Thus by coaction between the cam 110 and the roller 117 on the link 118, the shaft 47 is gradually moved anti-clockwise in Fig. IX, such movement being communicated to the chain 49, which, as hereinbefore explained, is connected by the arm 52 and the link 53 to the belt-carrying frame 15. During the outward movement of the carriages 56, 56a after they have delivered the new paper roll R', the above described action is reversed so that the belts 10 are gradually moved toward the new roll R' with progressively increasing mutual contact between said belts and the roll surface until the belts are restored to their normal operative positions when said carriages finally complete their outward travel on the bracket arms 4. It is to be particularly noted from Fig. IX that normally the cam 110 is clear of the roller 117 as shown so as not to interfere with the rocking movement of the belt frame 15 during the decrease in the diameter of the running roll.

In order to maintain the running paper roll R definitely positioned laterally between the frames 1, 1a, there is provided a marginal control means which is shown in Figs. I and XVIII–XXX. This marginal control means includes a pair of jaws 122, 123 with pivotally connected segmental shoes 125, 126 at their swinging ends adapted to engage the circumferential groove of a disk D secured to the mandrel of the running paper roll R. The jaw 122 is fulcrumed to swing about an eccentric 127 on a stud 128 (Fig. XXI) rotatably supported in the side frame 1a; while the jaw 123 is fulcrumed to swing about a stud 129 fixed in said frame. Another fixed stud 130 in the frame 1a is disposed in line with and centrally positioned between the studs 128, 129, as shown in Fig. XXI. Guided for in and out movement on these three studs 128—130 is a cross head 131 whereof the opposite ends are clevised as at 132, 133 to receive the fulcrum bosses of the jaws 122, 123. Thus as the cross head 131 is shifted on the studs 128—130, the jaws 122, 123 are obliged to follow suit and through engagement with the disk D, move the roll R axially in the fixed bearing blocks 5. The cross head 131 is shiftable for the purpose just explained by means of an adjustable screw 135 which is rotatable but restrained against axial movement in said head and which engages the threaded bore of the stud 130, see Figs. XIX and XXI. At its outer end, the screw 135 is provided with a hand wheel 136 for convenience of manipulating it. As shown in Figs. II, XVIII and XVIIIa, the jaws 122, 123 are provided with rearwardly-extending arms 137, 138 which, by means of toggle links 139, 140, are coupled with the toggle pin 141. At the region of coupling the link 139 is clevised at at 142 in Fig. XXVIII to fit over a boss 143 on the link 140, the pin 141 being secured in said boss by a set screw 145 (Fig. XIX) and provided at its outer end with a manipulating knob 146. The inner end of the pin 141 projects into a longitudinal groove 147 in the outer side face of an arm 148 rigidly secured to and extending rearwardly from the cross head 131 (Figs. XVIII and XIX). By leftward movement of the knob 146 in Fig. XVIIIa, the jaws 122, 123 are closed, and the shoes 125, 126 carried by them brought into engagement with a groove of the disk D, as shown in Figs. I and XVIII. Normally, engagement between the shoes 125, 126 and the disk D is relatively free to avoid imposition of restraint against the rotation of the running paper roll R. However, in the event that the printing press is slowed down for any reason, the marginal control may be used as a brake means to retard rotation of the paper roll R and prevent over-running of its web W, by turning the stud 128 clockwise in Fig. I, by means of the handle shown at 150, as a result of which the eccentric boss 127 of said stud causes further inward movement of the jaw 122 relative to the jaw 123 so that the shoes 125, 126 exert frictional pressure upon the disk D. Means is also provided whereby frictional pressure is also applied to the disk D automatically for a purpose later on explained, including a solenoid 151 whereof the armature 152 is coupled by means of a link 153 with an arm 154 affixed to the eccentric stud 128. When the jaws 122, 123 are closed, the toggle connection formed by the links 139, 140 is locked against being collapsed under the action of a helical spring 155 in tension between the rearward arms 137, 138 of said jaws, by a latch member 156, see Figs. XVIII, XXVI, and XXVII. As shown in Figs. XIX and XXIII, the latch member 156 is forked as at 156a, 156b for pivotal connection, by means of trunnions 157, 158 to a rearward-extending central boss 131a of the head 131, and at its free end has a hook 156c which is adapted to engage behind a lateral projection 139a on the link 139 as in Fig. XXVI. The fork arm 156b of the latch member 156 is extended upwardly as shown in Figs. XXIII, XXV and XXVI, and carries a bolt 159 having an eccentric collar 159a at its inner end in engagement with the longitudinal slot 160a in a vertical arm 160 whereof the hub sleeve 160b is engaged in a boss 148a of the arm 148 and fits over the outer end of a shaft 161 which extends through the frame 1a axially in line with the trunnion pivots 157, 158 with a latch bolt 159. The bolt 159 is rotatably adjustable in the part 156b of the latch member 156 and is clampable in adjusted positions by the nut shown at 162 to adapt the replenishing mechanism for use with paper rolls of different diameters. Such adjustment is facilitated by coordination of a mark 156x on the end of projection 156b (Fig. XXIV) of the latch member 156 with graduations on the corresponding end of the arm 160. A spring 163 (Fig. XXVI) connected at one end to the bolt 159 and at the other end to a fixed anchorage 164 on the head 131, serves to yieldingly maintain the latch member 156 in latched position. As shown in Figs. XIX and XXIII, the arm 160 is keyed to the rock shaft 161 with capacity for endwise sliding movement so as to accommodate in and out shifting of the head 131 in the manner above explained. Due to this construction, it will be apparent that slight clockwise movement of the rock shaft 161 will be attended by corresponding movement of the latch 156 out of engagement with the lateral projection 139a of the link 139, whereupon a spring pressed plunger 164 guided within a boss 131a of the head 131 acts upon the toggle joint of the links 139, 140 to break the toggle set up and allow the spring 155 to force the jaws 122, 123 to the open position as shown in Fig. XVIIIa. Guided in the boss 148b (Figs. XVIII, XVIIIa and XIX) at the outer end of the arm 148 is a spring pressed bolt 165, which, during opening of the jaws 122, 123 as above explained is struck by the inner end of the toggle pin 141, and projected as in Fig. XVIIIa so as to actuate the spring-pulled control lever 166 of a starting switch 167 secured to the outer side of the frame 1a, said switch being in circuit with the motor 65 for actuating the roll lifting mechanism.

The marginal control means must of course be opened before the running roll R can be lifted out of the bearing blocks 5 during the replenishing cycle. The means for accomplishing this automatically includes, in addition to the rock shaft 161, a link 169 having a longitudinal slot 169a at one end in engagement with a stud 170 at the outer end of an arm 171 secured to said rock shaft, see Figs. XVIII, XIX, XXV, and XXXI. At its other end, the link 169 is pivotally connected to an arm 172 on the rock shaft 51, see Fig. XXXII.

In order to hold the running roll against axial shifting as it is being elevated by the arms and afterwards, there is provided an auxiliary marginal control means, which, as shown in Figs. I, XVIII and XVIIIa, comprises an arm 175 fulcrumed at 176 at the outer side of the frame 1a at a level somewhat below that of the fulcrum studs 88 for the lifting levers 89, 89a, see Fig. XXXII. Pivoted on a pin 177 at the free end of the arm 175 is a shoe 178, which like the shoes of the main marginal control, is shaped to fit the groove of the disk D. As shown in Fig. XXX, the shoe 178 is confined between a fixed collar 179 on the pin 177 and the boss of a manipulating knob 180 at the outer end of said pin, which latter passes through a bearing boss 175a on the arm 175. Within the hollow of a head 175b at the inner end of the boss 175a, is a latch member in the form of a lever 181 capable of pivotal movement about a stud 182 and having threaded notch 181a which is adapted to coact with the threaded portion 177a of the pin 177. A spring-pressed plunger 183 (Fig. XXX) within the boss 175b coacts with a finger projection 181b of the lever 181 to normally maintain the threaded notch 181a in engagement with the screw portion 177a of the pin 177. The lever 181 also has a finger projection 181c which extends outward through an opening in the boss 175b and which during lowering of the arm 175 in a manner presently explained coacts with fixed cam projection 185 on the frame 1a as shown in Figs. XXIX and XXX, to dislodge the member 181 from the screw threads of the pin 177 so that the shoe 178 is free to center itself laterally in respect to the groove in the disk D in the mandrel M of the running paper roll R during descent of the arm 175. Attached to the boss 175b at the end of the swinging arm 175 is a projection 186 (Figs. I and XXXII) which carries a roller 187 adapted to rest on a cam-ended supporting ledge 188 on one of the bearing arms 90 of the elevating lever 89a. Thus, when the elevating levers 89, 89a are swung up and down to receive the expiring roll, the arm 175 of the auxiliary marginal control means moves with them. During elevation of the expiring roll R as the finger projection 181c of the lever 181 (Fig. XXX) moves away from the fixed projection 185 on the frame 1a, said lever is forced back into engagement with the screw threads of the pin 177 so said roll is held in the same position laterally of the press as when in its normal position. If after being elevated, the roll R should be out of line with the running web W, correction can be made by turning the knob 180 of the screw pin 177. Moreover, during elevation of the expiring roll R (Fig. XXXII) the roller 187 on the projection 186 on the head 175b will gradually move outward of the rounded end of the cam projection 188 on the arm 90 connected to the lever 89a. As a consequence, the shoe 178 will be permitted to move further into the groove of the disk D and operate as a brake to maintain the web of the expiring roll R under tension, in elevated position. Furthermore, by virtue of the eccentric relation between the fulcrum 176 of the arm 175 of the auxiliary marginal control and the fulcrum axis 88 of the elevating levers 89, 89a, the shoe 178 is moved through an area of approximately 180° from a position at the outer side of the edge of the disk D in Fig. XXX where it does not induce any braking effect while said arm 175 is lowered over the top of the disk, to a position at the inner side of the edge of said disk when the expiring paper roll R is fully elevated as in Fig. XXXII, whereby rotational restraint is induced in said roll by toggle action of the lever as and for the purpose above explained. Rotatively free on a shaft 189 (Figs. IIIa and XXXIII–XXXIX) extending transversely between bosses 190, 190a on fixed brackets 195, 195a extending inwardly from the frames 1, 1a, is a sleeve 189a carrying laterally spaced arms 191 whereof the outer ends are connected by suspension links 192, to the corresponding ends of hanger arms 193 which are fulcrumed at 194 on said brackets. Pivoted on pins 196 which form the connections between the arms 191 and the links 192 are the end members 197 of a cross-bar 198 to which a brush 199 is secured. As shown, the members 197 are provided with arcuate slots 197a which are concentric with the pivots 196, for passage of the shanks of headed clamp screws 192a which engage into the links 192. Due to this provision, the brush 199 can be angularly adjusted relative to the arms 191. Secured to the shaft 189 near the side frames 1, 1a are levers 200, 201 (Figs. III, IIIa) whereof the latter is bifurcated as at 201a (Figs. XXXIII–XXXIX) and engages a roller 202 eccentrically mounted on a disk 203 which is secured to the inner end of a rotary shaft 204 extending outward through a bearing 205 on said frame, see Figs. III and IIIa. By means to be described later, the shaft 204 is turned through a single revolution in the direction of the arrows shown in Figs. XXXII, XXXIII, during each replenishing cycle of the mechanism. The opposite end 201b of the lever 201 is coupled, by means of a helical tension spring 206, with the swinging end of one of the arms 193 and the lever 200 similarly connected to the other of said arms. As a consequence the lower edges of the arms 191 are normally maintained in contact with the top of lateral lug projections 207 on the levers 200, 201 as shown in Figs. XXXII, and XXXVI, whereby the brush 199 is held normally elevated.

Secured to the rear edges of the upper portions of the frames 1, 1a are bearings 208 (Figs. I and IV) which afford journal support to a transverse rock shaft 209 at a level somewhat below that of the shaft 189 (Figs. XXXII–XXXIX). A longitudinal knife blade 210 secured tangentially to the shaft 209, normally occupies the position shown in Fig. XXXIII with its serrated cutting edge protected within the recess 211a of a fixed guard rail 211 which extends crosswise between the frames 1, 1a and which is suitably supported in its opposite ends by brackets 212, and 212a (Figs. III and IIIa) respectively on said frames. Fast on the shaft 209 is a collar 213, see Fig. XLI, with laterally spaced upward fingers 214, 215 whereof the former has a notch 214a in its front edge and the latter a notch 215a in its top adjacent its rear edge. Pendant from the collar 213 is a pin 216 which serves as an anchorage for one end of a helical tension spring 217 whereof the other end is connected to a stud 218 (Fig. XXXII) on the bracket 212a. The spring 217 thus tends to move the shaft 209 counter-clockwise in Fig. XXXIII. The knife blade 210 is held normally in its raised inactive position by a finger 219 having a hook 219a at its free end adapted to coact with the notch 214a on the projection 214 of the collar 213 as in Fig. XXXIII. As shown, the finger 219 is fulcrumed for rocking movement on a fixed stud 220 projecting inward of the frame 1a from the bracket 212a. A spring 221 in tension between a stud 222 on the curved tail 219b of the finger 219 and a stud 223 on the contiguous bearing 190a serves to hold the finger latched with the projection 214 of the collar 213. Also mounted on the stud 220 is a lever 225 whereof the rear end is bifurcated as at 226 and in engagement with a roller 227 on the end portion 201b of the lever 201. To the other end of the lever 225 is pivotally connected a vertical latch member 228 which has a pendant tail 228a connected by a spring 229 to a stud 230 projecting from the boss of the lever 225. By means of the spring 229 the latch member 228 is urged forwardly or leftward in Fig. XXXIII, said latch member having a hook 228b at its upper end adapted to coact with the notch 215a of the upward projection 215 of the collar 213. The latch member 228 also has a laterally projecting stud 229 which as later on explained, is adapted to ride a curved ledge 230a on a bracket piece 230 secured to the back of the knife guard 211. Fulcrumed at 231 on the arm 201b of the lever 201 is a trip member 232 whereof one end 232a bears against a roller 233 on the arm 191, and whereof the other arm 232b carries a roller 234 which bears upon the curved tail 219b of the latch member 219.

As the shaft 204 begins turning from its normal position in Fig. XXXII, the arm 201 is moved counter-clockwise and the brush 199 thereby brought downward gently to press the running web W of the expiring paper roll R into contact with the new roll R', the pressure being gradually increased as the spring 206 is stretched. In the meantime the hook member 228 is elevated while sustained upright against the projection 215 of the collar 213 so that its lateral stud 229 is brought above the plane of the curved ledge 230a as shown in Fig. XXXVIII. Through cooperation between the trip lever 232 and the roller 233 in the arm 191, the latch member 219 is eventually withdrawn from the projection 214 of the collar 213 as shown in Fig. XXXIV and the shaft 209 released to the action of the spring 217. As a consequence, the shaft 209 is suddenly turned counter-clockwise until the projection 214 is intercepted by the guard rail 211 as shown in Figs. XXXV and XXXIX. The knife blade 210 is thus forcibly thrust through the tensioned web W of the spent paper roll R and said web cleanly severed as also shown in Fig. XXXV. During the last described action the hook member 228, impelled by the spring 229 follows the movement of the projection 215 of the collar 213 but its hook prevented from engaging the notch 215a of said projection as the stud 229 rides over the top of the ledge 230a. Later however, the stud 229 drops off the ledge 230a to permit the hook member 228 to drop back into engagement with the projection 215 as shown in Fig. XXXIX in readiness to return the knife 210 to its normal position. Thus upon continued rotation of the shaft 204, the hook member 228 is pulled by counter-clockwise movement of the lever 225 as in Fig. XXXV to return the knife 210 to its normal position. Finally by the time the shaft 204 has completed its revolution, the latch member 219 is re-engaged with the projection 214 of the collar 213 to lock the blade 210 in retracted position, and the brush 199 elevated clear of the newspaper roll R' and so held by coaction of the projection 207 on the arm 201 with the lower edge of the lever 191 as shown in Fig. XXXII.

The shaft 204 is arranged to be turned by means best seen from Figs. XLII–XLVI. Fixed on the continuously rotating vertical shaft 45 driven from the press 2 is a miter pinion 235 in mesh with a similar pinion 236 on a short shaft 237 which parallels the shaft 204 and which, like the latter, passes through the side frame 1a. A spur pinion 238 at the outer end of the shaft 237 meshes with spur gear 239 on a hollow drum 240 (Fig. XLIV) which is free on the corresponding end of the shaft 204. Keyed to the shaft 204 within the drum 240 is a split annular friction shoe 241 which is expandable by means of a spreader 242 engaging in the interval between its split ends (Figs. XLIV and XLV). The stem 242a of the spreader 242 extends outward through a disk 240a keyed to the shaft 204 with the shoe 241 (Fig. XLIV), and to its outer end is secured an arm 243 with a frusto-conical roller 244. As shown in Fig. XLIII, the roller 244 is in the path of the counter-coned end 245 of a sleeve 246 which is keyed to the shaft 204 and adapted to be axially shifted, through the medium of a spring 247 (Fig. XLIV), by another collar 248 free on said shaft. From Figs. XLII, XLIII, it will be noted that the sleeve 248 has a collar 248a engaged by rollers 249 on the bifurcated upwardly extending arm 250a of a bell crank 250 fulcrumed at 251 on a cylindrical boss 252 which is supported by a bracket 253 on the frame 1a. Slidable in the boss 252 is an upwardly spring-pressed bolt 255 with a projection at its upper end 255a adapted to coact with a beveled cam lug 256 on the inner face of a collar 246a on the sleeve 246, see Figs. XLIII, XLIV and XLVI. The lower end of the bolt 255 is pivotally connected at 257 to the upper end of a drop link 258 which is in turn connected at its lower end, to a vertical slide bar 259. As shown in Fig. XLII, the slide bar 259 is confined to movement in a fixed guide bracket 260 on the frame 1a and connected by a curved link 259a to a bolt 261 which is confined to axial movement in another fixed guide 262 on said frame. A portion of the bolt 261 is threaded for engagement by clamp nuts 263 between which a collar 265 with a lateral projection 265a is secured, said projection being in the path of a finger 266 swingable about a fixed stud 267 on the frame 1a. Integrally formed with the finger 266 is an arm 266a with a roller 268 at its free end adapted to be engaged by a cam sector 269 at the back of the disk D on the mandrel M' of the paper roll R'. The roller 268 and the cam sector 269 have their edges oppositely beveled as shown in Fig. XLIII so as to interlock with each other during the interval of cooperation. From Figs. XLII–XLIV it will be observed that the hub of the finger 266 is circumferentially grooved for engagement by inwardly extending trunnions 270 of a yoked shifting lever 271 at one end of a horizontal rock shaft 272 journaled in a bearing 273 on the frame 1a. Another arm 274 at the other end of the rock shaft 272 is connected, by means of a link 275, with the armature 276 of a solenoid 277, said arm being subject to the downward pull of a spring shown at 278. Affixed to the vertical link 258 adjacent the upper end thereof is a lug 280 which has a pin and slot connection at 281 with the lower end of a short link 282 whereof the top end is pivotally connected to the horizontal arm 250b of the bell crank 250 previously referred to, said horizontal arm having a roller 283 which rides on the periphery of the cover disk 240a of the drum 240. As shown in Fig. XLV, the disk 240a has a recess at 284 in which the roller 283 on the bell crank 250 normally rests; and to said disk is secured a stop lug 285 (Fig. XLII) which is normally engaged by an outwardly spring-pressed plunger 286 longitudinally slidable in a hollow arm 287, see Fig. XLII.

As shown, the arm 287 is pivoted at 288 on the frame 1a and coupled, by means of a link 289, with the lower end of the bolt 255. Fulcrumed in a bracket 290 centrally of the knife guard rail 211 is a gravity arm 291 with rollers 292 at its swinging end adapted to bear upon the surface of the running roll R after the latter has been elevated to the position shown in Figs. II, III and IV. On the arm 291 is mounted a mercoid switch 293 which is in circuit with the solenoid 277 as well as with a switch 295 shown at Fig. XLII.

The actuating arm 296 for the switch 295 lies in the path of the bolt 261 and is pulled upward by a spring 297 so as to be normally held in engagement with the end of said bolt as shown in Fig. XLII. A finger 298 suspended from the outer end of a pin 299 journaled in the frame 1a is subject to a spring 298a which tends to move it toward a fixed stop 300. Normally the finger 298 is held away from the stop 300 by a projection 296a on the switch actuating arm 296. A pendant arm 301 at the inner end of the pin 299 lies in the path of an outwardly spring pressed bolt 302 (Figs. XVI and XVII) on the transfer carriage 56a. Under certain conditions of press operation the arm 301 is restrained by a sector stop 303 which is affixed to the inner end of a shaft 304 extending through the frame 1a, and arranged to coact with a lateral stud projection 301a on said arm. Normally the sector 303 is positioned as shown in Fig. XVI out of the way of the arm 301 by a toggle spring 305 connected at one end to a fixed stud on the frame 1a, and at the other end to a stud fixed in a finger 306 which is secured to or integrally formed with said arm. To the outer end of the shaft 304 is affixed a handle 307, which, when swung from the position shown in Fig. XVI to that of Fig. XVII, moves the sector 303 into active position, with attendant actuation by the finger 306 of another switch 308 on the frame 1a.

Immediately outward of the disk 203 (Fig. XLIII), the shaft 204 carries a disk cam 310 having a peripheral rise 310a (Figs. XLVII, XLVIII, XLIX and L); and arranged to cooperate with the cam is a roller 311 at the end of the crooked arm 312a of a lever 312 fulcrumed at 313 on the side frame 1a. By means of a link 315, the lever 312 is coupled with an arm 316 on a shaft 317 supported in a bearing bracket 318 (Fig. XLVIII) on the frame 1a. Also secured to the shaft 317 is a miter pinion 319 which meshes with a similar pinion 320 on another shaft 321 journaled in the bracket 318. An arm 322 (Fig. XLVIII) affixed to the miter pinion 320 is coupled, by means of a link 323, with a shifter yoke 325 of which the boss slidably embraces the sleeve 32 on the shaft 33 and of which the arms carry inward projections 326 that engage the circumferential groove 31a of the clutch collar 37 on the shaft 29. Connected near one end to the pivot bolt 327 which joins the link 312 with the arm 316 is a bar 328 having a cam slot 329 at its opposite end in engagement with a fixed stud 330 on the frame 1a, and also a hook 331, adapted, for a purpose presently explained, to engage a notch 332, see Figs. XXXII and XLIX, in the edge of the gear sector 103 of the paper roll lifting lever 89a as said lever moves downward. A tension spring shown at 333 and connected to the left hand end of the bar 328 tends to move the latter upward about the pivot 327.

Upon energization of the solenoid 277, the finger 266 is shifted outward on the stud 267 (Figs. XLII and XLIII) and the roller 268 thereby placed in the plane of the sector cam 269 on the disk D' of the mandrel M' of the substitute paper roll R' and said finger moved clockwise in Fig. XLII. By this action the bolt 261 is depressed and its movement communicated through the link 259a the slide bar 259 and the rod 258 to the bolt 255 whereby the upper end of the latter is withdrawn from engagement with the cam projection 256 on the collar 246a, and the arm 287 at the same time swung to withdraw its pin 286 from the stop projection 285 on the disk 240a. The sleeve 246 is thus released to the action of the spring 247 (Fig. XLIV) and its conical head thrust into engagement with the conical roller 244 on the actuating arm 243 for the friction band spreader 242. As a consequence, the friction band 241 is expanded to drive the disk 240a in the direction of the arrow in Fig. XLV and thereby initiate rotation of the shaft 204 for actuation of the severing means in the manner hereinbefore explained. During rotation of the disk 240a, the roller 283 on the shifter bell crank 250 rides the high portion of the periphery of the disk 240a so that the sleeve 246 is held in its inward position to keep the gear 239 clutched to the shaft 204. As the shaft 204 is about to complete its revolution, the roller 283 on the bell crank drops back into the edge depression 284 in the disk 240a with attendant outward retraction of the sleeve 246 and contraction of the friction band 241, and de-clutching of the gear 239. Since the downward withdrawal of the bolt 255 is but momentary under the action of the sector cam 269 on the mandrel disk D', said bolt is in the meantime restored to normal position by its spring. Thus when the beveled projection 256 at the back of the collar 246a arrives at the projection 255a at the top of the bolt 255, the sleeve is moved outward somewhat further on the shaft 204 against the action of the spring 247 and locked. The shaft 204 is finally stopped by engagement of stop projection 285 on the disk 240a with the pin 286 in the arm 287.

Before the new paper roll R' is placed in position on the arms 4, 4a of the frames 1, 1a, thin stripes of paste P are applied to the underside of the leading edge of the web W' as shown in Fig. LI. In this way the end of the paper web of the roll R' is held down while said roll is being brought up to speed as later set forth. After the web end has been secured as just explained, wider stripes of adhesive are applied near the leading edge of the web W at the outside as shown in P' in Fig. LII, said stripes being likewise spaced so as to avoid fouling of the belts 10. As another prepartory step, one end of the roll is marked at one end with a radial line X to inwardly form the leading edge of the web of said roll, and the mandrel M' rotatively adjusted in the roll so that the rear edge of the cam sector 269 (as considered in respect to the direction of rotation) is spaced by an angle of approximately 150 degrees from said line. By virtue of this setting of the disk D', the severing operation is so timed that a definite amount of overlap is determined between the trailing cut end of the severed web W and the leading end of the web of the new roll as shown in Fig. LIII.

In addition to the various switches hereinbefore referred to, the electrical equipment for governing the operation of the mechanism includes, as diagrammatically shown in Fig. LIV, control boxes 335, 336 respectively for the motors 65, 95. Enclosed in the control box 335 for the motor 65 are magnets 337, 338 respectively for actuating multi-contact switches 339, 340. The control box 336 for the motor 95 likewise encloses magnets 341, 342, respectively, for actuating multi-contact switches 343, 344. The push button switches shown at 345, 346, and the snap switch shown at 347 in Fig. LIV are for manual control of the mechanism in a manner hereinafter explained.

The operation of the mechanism is as follows: Let it be assumed that the printing press 2 is in action and that the web W is being supplied from the running roll R in normal position as in Fig. VI. Under the influence of the weighted lever 46, the belts 10 (which at this time are driven at slow speed) are held in pressure contact with the roll R for maintenance of the web W under suitable tension in a manner already understood. As the roll R decreases in size and the belts 10 follow up on it, the shaft 51 is turned in the direction of the arrow in Fig. VI. Finally when the roll R has been reduced to a predetermined diameter to about eight inches from an original diameter of, say, thirty-six inches, the slotted link 169 (Figs. V, XVIII, XVIIIa, XIX, XXIII-XXVII and XXXII), connected to the arm 172 on the shaft 51, actuates the arm 171. As a result, the shaft 161 is turned clockwise in Figs. XXV, XXVI to the position shown in Fig. XXVII and the latch 156 withdrawn from the projection 139a of the link 139 of the marginal control means. The links 139, 140 are forced rearward from the position of Figs. I, XVIII, XIX to the position shown in Fig. XVIIIa by the spring pressed plunger 164 in the boss 131a of the cross head 131 with attendant collapse of the toggle formed by said links and opening of the jaws 122, 123 to withdraw the shoes 125, 126 from the disk D', as in Fig. XVIIIa. During rearward movement of the links 139, 140, the spring pulled actuating lever 104 of the switch 105 (Fig. XVIIIa) is freed and said switch moved to the position shown in Fig. LV to bridge the contacts 348, 349 of said switch as in Fig. LV for a purpose which will become apparent later. As the rearward movement of the toggle links 139, 140 continues, the inner end of the pin 141 strikes the spring-pressed plunger 165 in the arm 148 thereby forcing the latter outward as shown in Fig. XVIIIa and causing movement of the switch lever 166 and closing of the switch 167 as in Fig. LV. As a consequence, the magnet 337 in the motor control box 335 will be energized to close the multiple switch 339 by flow of current from the power line wires 350, 351 in Fig. LIV through a circuit including the conductors 352, 353, 354, 355 and 356, the bridged contacts 357, 358 of the switch 167, the conductor 359, the bridged contacts 360, 361 of the switch 106, and the conductors 362, 360. The motor 95 is thereupon set into operation (with attendant release of its brake) by current supplied from the power wires 350, 351 by way of the conductors 352, 363, 364, 365, 366, 367, 368 and 360, the levers 89, 89a (Figs. I, II, IV and XXXII) raised through motion transmitted by the chain 98, the shaft 99, the chain 100 and the gearing 102, 103 and the expiring paper roll R bodily lifted from the bearings 5. Upon closing of the multiple switch 339, current flow is maintained through the holding magnet 337 by way of the conductors 352, 353, 354, 355, 440, contacts 371, 372 of the switch 107 and conductors 441, 374 and 360. As the levers 89, 89a begin their upward movement, the bar 328 (Fig. XLIX) hooked with the notch 332 in the sector 103 of the arm 89a, is pulled along, and the hook 331 finally withdrawn from said notch as shown in Fig. L through coaction between the cam slot 329 in the bar 328 and the fixed stud 330 on the frame 1a with the result that the shaft 317 is rotatively shifted clockwise in Fig. XLIX through the link 328 and the arm 316. By action of the miter gears 319, and 320, the arm 322 is in turn operated, and, through the link 323, causes shifting of the clutch collar 37 to the position shown in Fig. XLVII for driving of the belts 10 at the higher speed. Also upon initiation of roll lifting movement, the switch 106 (Fig. XXXI) is actuated by the projection 108 on the lever 89 and moved to the position shown in Fig. LVI. As the levers 89, 89a continue in their upward movement, the radial projection 94 on the hub of the lever 89 actuates the switch 82 and places it momentarily in the position shown in Fig. LVII with resultant energization of the magnet 342 and closing of the multiple switch 344 in the control box 336, the current flow from the line wires 350, 351 under the condition being by way of the conductors 375, 376, 410, 377, 378, the switch 82, the conductor 379, across the contacts 380, 381 of switch 87, the conductors 382, across the contacts 348, 349 of switch 105, and the conductors 383, 384, 385. Upon closing of the multiple switch 344 the motor 65 is set into operation by current flow established through a circuit including conductors 375, 386, 387, 388, 389, 385, and the carriages 56, 56a, supporting the new paper roll R' started in their advance inwardly along the arms 4, 4a concurrently with lifting of the running paper roll R. During elevation, the roll R will be held in check by coaction between the disk D with the shoe 178 on the arm 175 of the auxiliary marginal control means, which latter will move upwardly with said roll R as previously explained. As the carriage 56 leaves the switch 87 (Fig. XI), the latter is moved to the position shown in Fig. LVIII to bridge the contacts 390, 391 just before the projection 94 on the elevating lever 89 passes beyond the switch 82, and the latter returns to its normal open position, and so that current flow is maintained through the magnet 342 of the control box 336 and the multiple switch 344 thereby held closed. The current flow through the magnet 342 under this changed condition is by way of conductors 375, 376, 410, 377, 378, 392, 393, across contacts 394, 395 of the switch 85 and conductors 396, 397, 398, 385. During inward movement of the carriage 56, the frame 15 carrying the belts 10 is moved rearward through the position shown in Fig. VII by action of the chain 58 upon the sprocket wheel 116 and through the interposed parts previously described.

The upper limit of movement of the elevating levers 89 and 89a is determined upon actuation of the switch 107 by the projection 109 (Fig. XXXI) on the arm 89 with the result that the contacts 371, 372 of the latter are opened as in Fig. LIX and current flow interrupted through magnet 337 and the motor 95 stopped by opening of the multiple contact switch 339 in the control box 335, said levers thus coming to rest with the roll R fully elevated, the rollers 292 with the mercoid switch arm 291 in contact with said roll and the mercoid switch 293 placed in open position as also shown in Fig. LIX.

At about the same time, the carriages 56, 56a reach the position shown in Fig. XII when the bearing blocks 57 on the latter are released through encounter of the latches 73 with the fixed cam pieces 75. Upon further advance of the carriages the bearing blocks thus recede and let the mandrel M' of the new paper roll R' easily and smoothly down into the notches 6 of the fixed bearing block 5 as in Fig. I. As the carriages approach the inner limit of their travel the bolt 83 (Fig. XII) is actuated by one of them, such actuation being attended by operation of the switch 85 through the spring-influenced bell crank 84, whereby said switch is moved to bridge the contacts 400, 401 as shown in Fig. LX, while at the same time the other carriage actuates the finger 301 (Fig. XVI) with the result that through the arm 298 the switch 295 is actuated and thereby moved to the position shown in Fig. LX. As a consequence of these changes, current flow through the magnet 342 is interrupted and the circuit established through the magnet 341 of the control box 336 with attendant opening of the multiple switch 344 and closing of the multiple switch 343 for reversal of the motor 65. The circuit through the magnet 341 at this time is by way of the conductors 375, 376, 410, 402, across the contacts 400, 401 of the switch 85, the conductor 403 across the contacts 405, 406 of switch 308 and conductors 407, 384, 385. The current supply circuit for the motor 65 will, on the other hand, be by way of the conductors 375, 408, 388, 409 and 385, so that the carriages 56, 56a will be returned empty to the outer ends of the arm 4, 4a and the frame 15 incidentally moved outwardly by action of the carriage chain 58 upon the sprockets 116, the belts 10 being thereby gradually brought more and more into contact with the new paper roll and the latter soon brought up to speed in readiness for the pasting of its web to the web W running in the machine. As the carriage 56 (Fig. IX) moves away from the switch 85 at the initiation of its return travel, said switch is again operated—this time by the spring connected to its actuating lever 84 and shifted to the position shown in Fig. LXI. The current flow through the magnet 341 is however maintained to keep the switch 343 closed by way of conductors 375, 376, 410, 402, 411, contacts 390, 391 of switch 87, conductors 412, 413, 398, and 385.

As the carriages 56, 56a approach the outer limit of their return travel, the lever 86 of the switch 87 (Fig. XI) is actuated by the carriage 56 and said switch moved to the position shown in Fig. LXII, with resultant interruption of the current flow through the magnet 341, and opening of the multiple switch 343 in the control box 336 to stop the motor 65. In this connection it will be further noted that at the completion of the outward travel of the carriages 56, 56a, the bearing blocks 57 (Fig. IX) are intercepted by the fixed stops 71 on the frame arms 4, 4a and raised through coaction between the inclined groove and tongues 69, 70. Finally the latch hooks 72 are elevated under spring action and re-engage the bearing blocks 57, thereby to lock them in raised position.

Immediately after the mandrel M' of the new paper roll R' is deposited in the fixed bearing blocks by the transfer carriages 56, 56a, the attendant in charge of the printing presses grasps the knob 156 (Fig. XVIIIa) and moves it to reset the marginal control means in its normal position, i. e., in the position shown in Figs. I and XVIII, so that the shoes 125, and 126 are re-engaged in the circumferential groove of the disk D' to keep said new roll under control and to position it properly in readiness for the severing and pasting operation which is to follow shortly. During re-setting of the marginal control means as just explained the pin 165 moves away from the actuating lever 166 of the switch 167, thereby allowing the latter to be shifted back to its normal open position as shown in Fig. LXIII. At the same time the actuating lever of the switch 105 is engaged by the projection 139a on the toggle link 139 and returned to its normal position, also as shown in Fig. LXIII. In the meantime, the elevated expiring paper roll R is gradually becoming exhausted, and when it has finally dwindled down in diameter to about five inches, the mercoid switch 293 tilts to closed position as shown in Fig. LXIV.

A circuit (Fig. LIV) including conductor 415, switch 293, conductor 416, magnet coil 227, conductor 417, switch 295, and conductor 418 is thereby established and the arm 274 (Figs. XLII, XLIII) operated with attendant shifting of the bell crank lever 266 by the shifter arm 271 so that the roller 268 is placed in the path of the cam 269 on the marginal control disk D' on the mandrel M' of the new, now steadily revolving, paper roll R'. By actuation of the bell crank lever 266 the bolt 261 (Figs. XLII and XLIII) with incidental operation of the lever 296 of the switch 295 which is thereby moved to open position, as in Fig. LXV with consequent interruption of the circuit through the magnet coil at 277 (Fig. LIV). Also by depression of the bolt 261, the shaft 204 is set into motion to carry out the severing cycle in the manner previously explained during which the running web W, which has been pressed down upon the roll R' by the brush 199, is severed by the knife blade 210. Due to the heavy paste stripes P' on the outer surface of the new roll R', a strong union is made with the severed edge of the running web W so that the leading edge of the new web yields readily to separation from the narrower paste stripes P. During the latter part of the rotation of the shaft 204, and immediately after the paste has been effected, the projection 310a on the collar 310 (Figs. XLVII, XLVIII, XLIX and L) on said shaft engages the roller 311 on the arm 312 thereby causing, through the link 315, arm 316, miter gears 319, 320, arm 322 and link 323, restoration of the clutch collar 37 to its normal position, so that the belts 10 are driven at slow speed to induce a drag on the new substitute paper roll R' for the purpose of maintaining the paper web W under tension as it passes into the printing press.

In the event that the paper on the elevated roll R should prove to be crumpled or otherwise defective, a premature paste may be made at any time after the new roll has been brought up to the speed of the web W by pressing the button 346 (Fig. LXIII) in which case current flow is established from the power line 350 through the paste solenoid 277 by way of the conductors 415, 420, 421, button 346, conductor 416, magnet 277, conductor 417, closed switch 295, conductor 418 to power line 351.

With the new paper roll R' now in place and running, the exhausted roll R can be removed at any convenient time and another substitute roll placed in the bearings 57 of the carriages 56, 56a. After this has been accomplished, the levers 89, 89a may be lowered for which purpose the manual control push button switch 345 is provided. By closing the switch 345 as in Fig. LXVI, a circuit is established between the power lines 350, 351 through the magnet 338 in the control box 335 by way of conductors 352, 353, 354, 423, 424, bridged contacts of switch 345, conductors 425, contacts 426, 427, of the switch 105 and conductors 362, 360 with attendant closing of the multiple contact switch 340. Upon release of the push button 345 the current flow is maintained through the magnet 338 to hold the multiple switch 340 closed, by way of conductors 352, 353, 354, 423, 428, contacts 426, 427, of the switch 106, conductors 429, 374, and 360. With the multiple switch 340 closed, the motor 95 is rotated reversely by flow of current 350, 351 by way of conductors 352, 430, 431, 364, 366, 360. The levers 89 and 89a are thereby moved downward with incident actuation of switch 107 and shifting thereof to the position shown in Fig. LXVII, and come to rest upon actuation of the switch 106 by the projection 108 on the arm 89, which switch is thereby moved to the position shown in Fig. LIV also, whereby the circuit through the magnet 338 is interrupted and the motor 95 stopped, the electric control system having been thereby restored to the same condition as in Fig. LIV. During descent of the levers 89, 89a, the bearing arms 90 swing about their pivots in the manner already understood as they encounter the mandrel of the second substitute paper roll and finally fall beneath said mandrel in readiness for the performance of the next replenishing cycle.

In the event that either a manually controlled or an automatically controlled pasting operation should fail, the paper roll running in the fixed bearings 5 can be quickly stopped by closing the switch 347, in which event a circuit will be established through the solenoid 151 (Fig. LIV) by way of the conductors 415, 420, 435, 436, 418, with resultant contraction of the shoes 125, 126 of the marginal control upon the disk D, through the shaft 128, arm 154, link 153, and the armature 152 of the solenoid 151. The paper roll is thereby prevented from overrunning, with consequent avoidance of waste and entanglement of the paper in the printing press.

Preparatory to initially starting a "cold" press with the elevating levers 89, 89a empty and at rest in their upper positions with the jaws 122, 123 of the marginal control open as in Fig. XVIIIa and with the switches of the electric control system shown in Fig. LXVIII (the mercoid switch 293 being closed at this time in the absence of a paper roll in the bearings of the levers 89, 89a), a paper roll is placed in readiness upon the carriages 56, 56a. The lever handle 307 is then swung from the position shown in Figs. I and XVI to the position shown in Fig. XVII with attendant actuation of the switch 308 by the arm 306 and movement of said switch to the position shown in Fig. LXIX, and placement of the stop 303 into the path of the lever 301. Due to actuation of the switch 308 as just explained, current flow is established through the magnet coil 342 in the control box 336 by way of the conductors 375, 376, 410, 377, 378, 392, contacts 442, 443 of the switch 107, conductors 444, contacts 445, 446 of the switch 308, conductor 447, contacts 380, 381 of the switch 87, conductors 382, contacts 348, 349 of the switch 105 and conductors 383, 384, 385, as a consequence of which the multiple switch 344 is closed and the motor 65 started to move the carriages and the paper roll thereon inward on the arms 4, 4a. The current supply through the motor 65 under these conditions is by way of the conductors 375, 386, 387, 388, 389 and 385. The carriages 56, 56a are now moved inward on the frame arms 4, 4a and as they begin their inward movement, the switch 87 is actuated and shifted to the position shown in Fig. LXX, but a circuit through the control magnet 342 for the multiple switch 344 is maintained closed and keeps the motor 65 running by way of the conductors 375, 376, 410, 377, 378, 392, 393 across contacts 394, 395 of switch 85, conductors 396, 398, 385, and 385, so that the mandrel of the roll is eventually deposited in the fixed bearing blocks 5. In this instance, however, the carriage 56a is prevented from operating the switch 295 (Fig. XVII) due to the obstruction of the lever 301 by the stop 303, but the switch 85 (Fig. XII) is operated by the carriage 56 and shifted to the position shown in Fig. LXXI with resultant interruption of the circuit through the magnet 342 and stoppage of the motor 65. With the paper roll positioned in the bearings 5, its web may now be threaded through the press. As a consequence, the magnet 341 is energized by current supplied from the line wires 350, 351 by way of conductors 375, 376, 410, 402, across contacts 400, 401 of switch 85, conductor 403 across contacts 405, 406 of switch 308, conductors 407, 384 and 385 and the multiple switch 343 closes to reverse the motor 65. With this accomplished, the lever 307 is swung back to the normal position shown in Figs. I and XVI to restore the switch 308 to its normal position as in Fig. LXXIII. Under these conditions, the circuit through the motor 65, by way of conductors 375, 408, 388, 409, 389 and 385, and the carriages started outward on the frame arms 4. As the carriages begin this movement, and the carriage 56 leaves the switch 85, the actuating arm 84 of the latter is actuated by its spring to move said switch to the position shown in Fig. LXXIII, so that current flow is maintained through the magnet 341 by way of the conductors 375, 376, 410, 402, 411, across contacts 390, 391 of switch 87 and conductors 412, 413, 398, and 385. Finally when the carriages 56, 56a arrive at the outer ends of the frame arms 4, the carriage 56 moves the switch 87 back to the position shown in Fig. LXVIII whereby current flow to the magnet 341 is interrupted and the multiple switch 343 opened to stop the motor 65. After this has been accomplished and the jaws of the marginal control manually closed over the disk D of the paper roll, incident to which the switches 105 and 107 are reset, and the levers 89, 89a then lowered by pressing the push button 345 whereby the electrical control system is returned to the condition shown in Fig. LIV in readiness for automatic operation.

To adapt the mechanism for use of paper rolls of different standard diameters the nut 162 (Figs. XVIIIa, XXIII and XXIV) is loosened and the stud 159 turned in one direction or the other, whereby, through the eccentric 159a of said stud, the arm 160 on the shaft 161 is shifted angularly in respect to the upstanding projection 156b of the latch hook 156. The arm 171 affixed to the shaft 161 is thus in turn shifted through a like angular distance and the stud 170 on said arm moved either closer to or further away from the outer end of the slot 169a in the link 169, so that in the instant of tripping of the latch 156 is either advanced or delayed in accordance with the size of the paper roll which is to be used. The graduations (Fig. XXIV) on the end of the part 160 and the coordinating mark on the projection 156b of the latch member 156 are advantageous in facilitating the above adjustments and in making it possible to quickly and accurately replace the eccentric pin 159 in any of the positions it may have previously occupied. After the setting, the pin 159 is secured against accidental displacement by tightening the nut 162.

In this connection, it is to be observed that irrespective of the different diameters of the new substitute rolls or the speed of the press, the springs 206 (Figs. XXXII–XXXV) will insure quick descent of the brush 199 and maintain said brush in firm contact with said rolls while the arms 200 and 201 continue their downward movement for release of the severing knife 210.

It is of course to be understood that the roll diameters herein given are meant to serve for the purposes of exemplification only, since they are subject to extensive variation in practice. It will also be understood that the details of the different sub-mechanisms may be made in the replenishing mechanism as may be found convenient or desirable in practice without departing from the spirit of my invention as defined in the appended claims. I further consider it within the province of my invention to arrange several of the replenishing mechanisms in superposed relation for use with printing presses of the multiple deck type.

Having thus described my invention, I claim:

1. In paper replenishing mechanism for printing presses, means for displacing a running paper roll, upon nearing exhaustion, from a normal position to another position to make room for substitution of a new roll; transfer means for delivering the new roll; a follower to cooperate with the running roll in normal position; means controlled by the follower and operative upon decrease of the running roll to a predetermined diameter while in normal position, to actuate the displacing means for repositioning of the running roll as aforesaid; means controlled by the displacing means and operative incident to displacement of the running roll as aforesaid to effect actuation of the transfer means so that the new roll is conveyed to the position vacated by the running roll in readiness to be later taken by the displacing means preparatory to a succeeding replenishing cycle; a second follower to cooperate with the running roll in displaced position; and means controlled by the second follower means and operative upon substantial exhaustion of the running roll in its displaced position, to connect its web to the new roll and to sever said web.

2. Paper replenishing means according to claim 1, including variable speed means for normally driving the first follower at a speed to induce a drag on the running roll; means operative to control the variable speed means for driving the new roll after its transfer at a speed slightly in excess of the running web; and means for restoring the normal speed of said first follower upon severance and connection of the running web to said new roll.

3. In paper replenishing mechanism for printing presses, a follower to contact with a running paper supply roll and normally operated at a speed to impose a drag on such roll; variable speed drive means for the follower; a releasable marginal control means for the running roll; means controlled by the follower to release the marginal control when the running roll is reduced to a predetermined diameter; roll displacing means; means operated by the marginal control upon its release to initiate actuation of the displacing means to move the running roll to another position in the press; carriage means for a new paper roll; means controlled by the displacing means incident to its operation to initiate operation of the carriage means for advancing the new roll to the position vacated by the running roll; means controlled and operated by the carriage means as the new roll is advanced, to withdraw the follower from the running roll; means also currently controlled and operated by the displacing means whereby the variable speed means is influenced to increase the speed of the follower; means operated by the displacing means upon complete transfer of the running roll and the new roll to their new positions to effect reversal of the carriage means and incidental restoration of the follower into contact with the new roll; web severing and connecting means; a second follower to contact with the running roll while in displaced position; means controlled and actuated by the second follower upon exhaustion of the latter roll to effect actuation of the severing and connecting means to sever the running web and to connect it to the new roll; and means controlled and operated by the severing and connecting means at the time of its actuation to influence the variable speed means for reduction of the speed of the first follower to impose a drag on the new roll.

4. Paper replenishing means for printing presses according to claim 45, including an auxiliary marginal control for governing the running roll during its displacement and subsequently while it is being exhausted.

5. In paper replenishing mechanism for printing presses, means for displacing a running paper roll, upon nearing exhaustion, from a normal position to another position to make room for substitution of a new roll; releasable marginal control means for controlling the running roll while in normal position; a follower to cooperate with the running roll in normal position; and means operated by the follower upon decrease of the running roll to a predetermined diameter in normal position to effect release of the marginal control means; means governed by the marginal control means and operative incident to its release to effect actuation of the displacing means for repositioning of the running roll as aforesaid; a second follower to cooperate with the running roll in displaced position; and means controlled by said second follower and operative upon substantial exhaustion of the running roll while in displaced position to connect its web to the new roll and to sever said web.

6. In paper replenishing mechanism for printing presses, means for displacing a running paper roll, upon nearing exhaustion, from a normal position to another position to make room for substitution of a new roll; a releasable marginal control means for controlling the running roll while in normal position; a follower to cooperate with the running roll in normal position; transfer means for delivering the new roll; means controlled by the follower and operative upon decrease of the running roll to a predetermined diameter in normal position, to effect release of the marginal control means; means governed by the marginal control means and operative incident to its release to effect actuation of the displacing means for repositioning the running roll as aforesaid; a second follower to cooperate with the running roll in displaced position; and means controlled by the first follower and operative incident to displacement of the running roll to effect operation of the transfer means; and means controlled by the second follower and operative upon substantial exhaustion of the running roll in displaced position to connect its web to the new roll and to sever said web.

7. In paper replenishing mechanism for printing presses, means for displacing a paper running roll, upon nearing exhaustion, from a normal position to another position to make room for substitution of a new roll; an electric motor for driving the displacing means; a switch in circuit with the motor; transfer means for delivering the new roll; an electric motor for driving the transfer means; a switch in circuit with the last mentioned motor; a follower to cooperate with the running roll in normal position; and means controlled by the follower and operative upon decrease of the running roll to a predetermined diameter in normal position to automatically actuate the switch for the driving motor of the displacing means for actuation of the latter to reposition the running roll as aforesaid; means controlled by the displacing means and operative to automatically effect actuation of the switch of the motor of the transfer means to effect conveyance of the new roll to the position vacated by the running roll in readiness to be later taken by the displacing means preparatory to a succeeding replenishing cycle; a second follower to cooperate with the running roll in displaced position; and means controlled by said second follower and operative upon substantial exhaustion of the running roll in its displaced position to connect its web to the new roll and to sever said web.

8. In paper replenishing mechanism for printing presses, means for displacing a running roll, upon nearing exhaustion from a normal position to another position to make room for substitution of a new roll; an electric motor for driving the displacing means; a switch in circuit with said motor; releasable marginal control means for controlling the running roll while in normal position; a follower cooperating with the running roll in normal position; means automatically controlled by the follower and operative upon decrease of the expiring roll to a predetermined diameter in normal position to release the marginal control means; means operated automatically by the marginal control means incident to its release to actuate the switch for the motor of the transfer means so that the new roll is conveyed to the position vacated by the running roll; a second follower to cooperate with the running roll in displaced position; and means controlled by the second follower and operative upon substantial exhaustion of the running roll in displaced position, to connect its web to the new roll and to sever said web.

9. In paper replenishing mechanism for printing presses, means for displacing a running paper roll, upon nearing exhaustion, from a normal position to another position to make room for substitution of a new roll; releasable marginal control means for controlling the running roll in normal position; an electric device for releasing the marginal control means; transfer means for delivering the new roll; an electric motor for driving the transfer means; a follower to cooperate with the running roll in normal position and operative upon decrease of the running roll to a predetermined diameter to close a circuit through an electric device and thereby effect release of the marginal control means; means governed by the marginal control means and operative incident to its release to close a circuit through the motor for the displacing means and thereby effect repositioning of the running roll as aforesaid; means governed by the displacing means and operative during displacement of the running roll to close a circuit through the motor of the transfer means and thereby effect delivery of the new roll to the position vacated by the running roll; a second follower to cooperate with the running roll in displaced position; and means controlled by the second follower and operative upon substantial exhaustion of the running roll in displaced position to connect its web to the new roll and to sever said web.

10. In paper replenishing mechanism for printing presses, a pair of fixed laterally-spaced open top bearings for rotatively supporting the ends of the mandrel of a running paper roll; a follower to cooperate with the running roll in normal position; and means controlled by the follower and operative, as the roll nears exhaustion, to lift the running roll from the bearings to a higher level in readiness for substitution of a new paper roll, including a pair of laterally-spaced levers, and arms with bearing notches respectively connected by knuckle joints to the swinging ends of said levers so that as the latter are moved downward, said arms may pivot to pass the roll mandrel and eventually drop into position below said mandrel in readiness to lift the roll when the levers are subsequently moved upward.

11. Paper replenishing mechanism for printing presses according to claim 10, wherein the lever operating means includes a reversible electric motor, and gear connections between said motor and the levers.

12. In paper replenishing mechanism for printing presses, a pair of laterally-spaced fixed open-top bearings for rotatively supporting the opposite ends of the mandrel of a running paper roll; means operative as the running roll nears exhaustion to lift it out of the fixed bearings and rotatively support it at a higher position; a pair of horizontal tracks leading to the fixed bearings; a pair of carriages normally at the outer ends of the tracks; vertically-movable open-top bearings on the carriages normally at a slightly higher level than the fixed bearings, adapted to support the mandrel of a new paper supply roll; means for moving the carriages inward along the tracks; and means automatically operative as the carriages approach the limit of their inward movement on the tracks to lower the bearings on said carriages for deposit of the ends of the mandrel of the new paper roll into said fixed bearings.

13. Paper replenishing means for printing presses according to claim 12, including means for automatically returning the carriages to normal position on the tracks, and means automatically operative as the carriages are subsequently returned to the outer ends of the tracks to raise the vertically movable bearings to their normal positions on said carriages.

14. Paper replenishing mechanism for printing presses according to claim 12, wherein the movable bearings have inclined sliding connections with the carriages and are normally held in their upper positions by latches on said carriages; and wherein means are provided to automatically trip the latches as the carriages approach the limit of their inward movement on the tracks for release of movable bearings so that they may recede on the inclines to deposit the ends of the mandrel of the new paper roll into the fixed bearings.

15. Paper replenishing means for printing presses according to claim 12, wherein the movable bearings have inclined sliding connections with the carriages and are normally held in their upper positions by latches on the carriages; wherein means are provided to automatically trip the latches as the carriages approach the limit of their inward movement on the tracks for release of the movable bearings so that they may recede on the inclines to deposit the ends of the mandrel of the new paper roll into the fixed bearings; and wherein means is provided as the carriages are subsequently returned to the outer ends of the tracks to automatically restore the movable bearings to their normal positions and locked by the latches.

16. In paper replenishing mechanism for printing presses, a pair of laterally-spaced fixed open-top bearings for rotatively supporting the opposite ends of the mandrel of a running paper roll; displacing means operative as the running roll nears exhaustion to lift it out of the fixed bearings and rotatively support it at a higher position; a pair of horizontal tracks leading to the fixed bearings; a pair of carriages normally at the outer ends of the tracks and having open bearings adapted to receive the ends of the mandrel of a substitute roll; and means for actuating the carriages including endless chains to which the carriages are respectively connected; a reversible electric motor for driving the chains to move the carriages in and out on the tracks; control means actuated through movement of the displacing means for initiating the operation of the motor for inward travel of the carriages; a switch actuated by one of the carriages upon arrival of said carriages at their inner limits of travel and delivery of the substitute roll, for automatically reversing the motor to return the carriages to their normal position; and another switch actuated by one of the carriages as they arrive at their outer limits of travel to interrupt current flow to the motor.

17. Paper replenishing mechanism according to claim 38, wherein the first follower is in the form of an endless belt, and trained about pulleys on a counter weighted pivoted frame.

18. Paper replenishing mechanism according to claim 39, wherein the first follower is in the form of an endless belt and trained about pulleys on a pivoted counterweighted frame.

19. A paper replenishing mechanism for printing presses according to claim 40, wherein the follower has the form of an endless belt supported by pulleys on a pivotally mounted frame, and wherein means influential upon the frame serves to maintain the belt yieldingly in contact with the roll.

20. Paper replenishing mechanism for printing presses according to claim 40, wherein the follower has the form of an endless belt supported by pulleys on a frame which is secured to the rock shaft; and wherein the rock shaft is subject to a counterweight for maintenance of the belt in yielding contact with the roll.

21. In paper replenishing mechanism for printing presses, a pair of fixed open top bearings for rotatively supporting the opposite ends of the mandrel of a running paper roll; means for rotating the roll; a retractable follower driven by power and adapted by surface contact with the running paper roll to induce a drag thereon for maintenance of its web under tension; means operative as the running roll nears exhaustion to lift it out of the bearings and rotatively support it at a higher position in the press; a pair of tracks leading to the bearings; a pair of carriages normally at the outer ends of the tracks and having open top bearings for the reception of the ends of a mandrel of a new paper supply roll; and means interconnecting the carriages and the follower and operative during inward movement of the carriages on the tracks in transferring the new roll to the fixed bearings, to retract the follower and during return of the carriages to their normal positions to move said follower into engagement with a new paper roll.

22. Paper replenishing mechanism for printing presses according to claim 21, wherein the roll rotating means has the form of an endless belt mounted on pulleys which are supported by a pivotally mounted frame.

23. In paper replenishing mechanism for printing presses, a pair of fixed open top bearings for rotatively supporting the opposite ends of the mandrel of a running paper roll in the press; an endless belt for rotating the roll through surface contact therewith; means operative as the roll nears exhaustion to lift it out of the bearings and rotatively support it at a higher position in the press; a pair of horizontal tracks leading to the bearings; a pair of carriages normally at the other ends of the tracks and having open top bearings for reception of the ends of the mandrel of a new paper supply roll; endless chains to which the carriages are connected; reversible means for actuating the chains, and means operated by one of the chains during inward movement of the carriages on the rails in transferring the new roll to the fixed bearings to retract the belt, and during return of the carriages to their normal positions to move said belt into engagement with the new roll.

24. Paper replenishing mechanism according to claim 21, wherein the belt is supported by pulleys on a frame secured to a rock shaft; wherein the rock shaft is subject to the influence of a counterweight whereby the belt is urged toward the paper roll, and wherein a shaft driven from one of the sprocket chains carries a cam, which, by coaction with a roller, operates to cause retraction of the belt as aforesaid, and which, upon being rotated in the opposite direction, is instrumental in advancing the belt gradually into contact with the new roll.

25. In paper replenishing mechanism for printing presses, means for supporting a running paper roll in normal operative position; means operative when the roll is reduced to a predetermined diameter to move it from normal position, to another position to make room for replacement thereof by a new roll; a disk on the mandrel of the running roll; marginal control means including a retractable element normally in engagement with a circumferential groove of the disk on the mandrel of the running roll while the latter is in normal position; a follower to cooperate with the running roll in normal position; and means controlled by the follower and operative upon substantial exhaustion of the expiring roll to effect withdrawal of the retractable element of the marginal control means from the disk and to effect operation of the means for repositioning the running roll as aforesaid.

26. In paper replenishing mechanism for printing presses, means for supporting a running paper roll on a mandrel in operative position; a disk on the mandrel; marginal control means adapted by coaction with the disk on the mandrel of the roll to maintain the latter definitely positioned transversely of the press, said marginal control means including a pair of pivoted jaws with shoes at their swinging ends for engaging a circumferential groove in the disk; a follower to cooperate with the running roll in normal position; means controlled by the follower and operative as the running roll nears exhaustion, to displace it bodily from normal position to another position to make room for a new substitute roll; transfer means for moving the new roll into the position vacated by the running roll; means controlled by the displacing means and operative during repositioning of the expiring roll as aforesaid, to open the jaws of the marginal control means for entry between them of a disk on the mandrel of the new roll; and means for closing the jaws upon the disk of the new roll.

27. In paper replenishing mechanism for printing presses, means for supporting a running roll on a mandrel in operative position; a disk on the mandrel; marginal control means adapted by coaction with the disk on the mandrel of the roll to maintain the latter definitely positioned transversely of the press, said marginal control means including a pair of pivoted jaws with shoes at their swinging ends for engaging a circumferential groove in the disk, toggle means connecting the jaws, spring means tending to break the toggle and a latch to lock the toggle; a follower to coact with the running roll in normal position; means controlled by the follower and operative as the running roll nears exhaustion, to trip tripping the latch and thereby permit opening of the jaws by the spring means; displacing means controlled by the jaws upon opening and operative to move the expiring paper roll to another position in the press to make room for a new roll; means for moving a new roll to the position vacated by the expiring roll; and means for closing the jaws of the marginal control upon a similar grooved disk on the mandrel of said new roll.

28. In paper replenishing mechanism for printing presses, means for rotatively supporting a running paper roll on a mandrel in the press; a disk on the mandrel; means for displacing the roll, upon nearing exhaustion, to another position in the press to make room for a new substitute roll; marginal control means including a shoe in engagement with a circumferential groove of the disk on the mandrel of the running roll while the latter is in normal position to keep it definitely positioned transversely of the press; auxiliary marginal control means including a member movable with the roll displacing means, and an auxiliary shoe pivoted on said member; means controlled by the roll displacing means as the latter is moved into position in readiness to displace the running roll, and operative to free the auxiliary shoe so that it may shift axially of its pivot and center itself in the groove of the disk on the mandrel of said running roll, and means controlled by the displacing means, and operative to lock the auxiliary shoe against shifting axially of its pivot.

29. In paper replenishing mechanism for printing presses, means for supporting a running paper roll on a mandrel in the press; a circumferentially-groove disk on the mandrel; coaxially fulcrumed horizontal arms for lifting the roll, upon nearing exhaustion, to a higher position in the press to make room for a new substitute roll; marginal control means including a shoe in engagement with the circumferential groove of the disk on the mandrel of the running roll while the latter is in normal position to keep it definitely positioned transversely of the press; auxiliary marginal control means including a horizontal arm fulcrumed for movement with the lifting arms aforesaid, and an auxiliary shoe pivoted to the swinging end of said arm; and means controlled by the roll lifting arms as they are moved into position in readiness to displace the running roll, and operative to free the auxiliary shoe so that it may shift axially of its pivot and center itself in the groove of the disk on the mandrel of said roll, and means governed by the elevating arms, during their displacing movement and operative to lock the auxiliary shoe against shifting axially on its pivot.

30. In paper replenishing mechanism for printing presses, means for supporting a running paper roll on a mandrel in the press; a circumferentially-grooved disk on the mandrel; coaxially fulcrumed horizontal arms for lifting the roll, upon nearing exhaustion, to a higher position in the press to make room for a new substitute roll; marginal control means including a retractable shoe in engagement with the circumferential groove of the disk on the mandrel of the running roll while the latter is in normal position to keep it definitely positioned transversely of the press; a follower to cooperate with the running roll in normal position; means controlled by the follower and operative when the running roll has decreased to a predetermined diameter, to actuate the lifting arms, and for actuating the marginal control to withdraw the retractable shoe from the disk on the mandrel; and auxiliary marginal control means including an arm movable with said lifting means and having a shoe pivoted to its swinging end, said arm being fulcrumed in eccentric relation to the lifting arms so that, as the latter are moved into position in readiness to displace the running roll, the auxiliary shoe enters the groove in the disk at one side of the latter, and as the lifting arms are moved to displace the running roll, the auxiliary shoe shifts around to the top of the disk to act as a brake for tensioning the web of the running roll in displaced position.

31. In paper replenishing mechanism for printing presses, means for supporting a running paper roll in a normal position in the press; means for moving the roll from the normal position to another position in the press upon nearing exhaustion including an electric motor; a switch in circuit with the motor; a follower maintained in yielding contact with the roll while the latter is in its normal position; a marginal control including clamp means in engagement with a disk on the mandrel of the running roll, spring toggle means tending to open the clamp means, and a latch member to normally hold the clamp means closed; and interposed link connections between the follower and the latch member, whereby when the paper roll has decreased to a predetermined diameter, the latch member is tripped and the spring influenced toggle released to the action of its spring, to close the switch for starting the motor to actuate the roll displacing means.

32. Paper replenishing mechanism for printing presses according to claim 31, including means whereby the interposed link connections can be adjusted to adapt the mechanism for operation upon rolls of different sizes.

33. Paper replenishing mechanism for printing presses, according to claim 31, wherein the latch member is in the form of a hook, and wherein the interposed connections include an arm on the axis of the hook, and a link having a longitudinal slot at one end in engagement with a pin on the arm and being coupled at the other end with the follower.

34. In paper replenishing mechanism for printing presses, means for displacing a running paper roll, upon nearing exhaustion, from a normal position in the press to make room for substitution of a new roll; a follower to cooperate with the running roll in normal position, means controlled by the follower and operative upon decrease of the running roll to a predetermined diameter while in normal position, to actuate the displacing means for repositioning of the running roll as aforesaid; carriage transfer means movable inward from a normal retracted position along a guide in conveying a new paper roll into position vacated by the running roll; means for driving the carriage means; means controlled by the displacing means and operative incident to displacement of the running roll to start the driving means; and means controlled by the carriage means and operative upon delivery of the new roll, to reverse the drive means and thereby effect return of the carriage means to normal position.

35. In paper replenishing mechanism for printing presses, means for displacing a running paper roll, upon nearing exhaustion, from a normal position in the press to make room for substitution of a new roll; a follower cooperative with the running roll in normal position; means controlled by the follower and operative upon decrease of the running roll to a predetermined diameter while in normal position, to actuate the displacing means for repositioning of the running roll as aforesaid; carriage transfer means movable inward from a normal retracted position along a guide in conveying a new paper roll into position vacated by the running roll; an electric motor for driving the carriage means; a switch automatically operated by the displacing means incident to displacement of the running roll to close a circuit through the motor; and another switch actuated by the carriage means upon delivery of the new roll, to reverse the motor circuit and thereby effect return of the carriage means to normal position.

36. In paper replenishing mechanism for printing presses, means for rotatively supporting a running paper roll on a mandrel; a disk on the mandrel; means for displacing the roll, upon nearing exhaustion, to another position to make room for a new substitute roll; marginal control means including a shoe in engagement with a circumferential groove of the disk on the mandrel of the running roll while the latter is in normal position to keep it definitely positioned transversely of the press; auxiliary marginal control means including a member movable with the roll displacing means, and an auxiliary shoe carried by a pivot stud on said member; means whereby, as the roll displacing means is moved into position in readiness to displace the running roll, the auxiliary shoe is freed to shift axially on its pivot stud and to center itself in the groove of the disk on the mandrel of the running roll; a latch member for the auxiliary shoe having a threaded notch which engages threads on the pivot stud; and a fixed trip projection whereby said latch member is retracted from the pivot during movement of the displacing means into operative position.

37. In paper replenishing mechanism for printing presses, means for rotatively supporting a running paper roll on a mandrel in the press; a disk on the mandrel; means for displacing the roll upon nearing exhaustion, to another position to make room for a new substitute roll; marginal control means including a shoe in engagement with a circumferential groove of the disk on the mandrel of the running roll while the latter is in normal position to keep it definitely positioned transversely of the press; auxiliary marginal control means including a member movable with the roll displacing means, and an auxiliary shoe carried by a pivot stud on said member; means whereby, as the roll displacing means is moved into position in readiness to displace the running roll, the auxiliary shoe is freed to shift axially of its pivot stud and to center itself in the groove of the disk on the mandrel of the runing roll; a latch member for the auxiliary shoe having a threaded notch which engages threads on the pivot stud; a fixed trip projection whereby said latch member is retracted from the pivot during movement of the displacing means into operative position; and means on the pivot stud whereby it may be turned to adjust the expiring roll axially in case its web is not running true upon displacement of said roll.

38. In paper replenishing means for printing presses, means for displacing a running paper roll, upon nearing exhaustion, from a normal position to a new position in the press; a follower running in contact with the running roll; variable speed drive means for driving the follower at a speed to normally impose a drag on the running roll; transfer means operative incident to displacement of the running roll for conveying a new paper supply roll into the position vacated by said running roll; means controlled by the displacing means and operated during displacement of the running roll to influence the variable drive means for increasing the speed of the follower in readiness, when the new roll is delivered, to bring said new roll into synchronism with the running web; a second follower to contact with the running roll when the latter is in displaced position; mechanism including a normally-quiescent actuating shaft, controlled by the second follower and operative to connect the web of the running roll to the new roll and to sever said web; and means operated by the actuating shaft of said mechanism upon the web severance and connection to influence the variable speed means for reduction of the speed of the first follower to normal.

39. In paper replenishing mechanism for printing presses, means for displacing a running paper roll, upon nearing exhaustion, from a normal position to another position to make room for substitution of a new roll; a follower with retractable supporting means to hold it in yielding contact with the running roll and normally driven at a surface speed somewhat less than that of the running web to maintain said web under tension; transfer means for conveying the new roll into the position vacated by the running roll; means controlled by the displacing means and operative during displacement of the running roll to retract the follower and to increase the speed of the follower to that of the running web, and during subsequent retreat of the said transfer means after delivery of the new roll, to move the follower into engagement with the new roll; a second follower to cooperate with the running roll in displaced position; mechanism, including a normally-quiescent actuating shaft controlled by the second follower and operative to connect the web of the running roll to the new roll and to sever said web; and means operated by the actuating shaft of said mechanism immediately after the web connection has been made to influence the variable speed means for reduction of the speed of the first follower to normal.

40. In paper replenishing mechanism for printing presses, means for rotatably supporting a running paper roll; a retractable follower running in contact with the running roll; variable speed means normally driving the follower at a speed to induce a drag on the running roll; displacing means operative as the running roll nears exhaustion for retracting the follower and for moving said roll from its normal running position to another position; means operated by the displacing means incident to its actuation to influence the variable speed means to increase the speed of the follower; transfer means for conveying a new substitute roll to the position vacated by the running roll; means for thereupon advancing the follower into engagement with a new roll; another follower to cooperate with the running roll in displaced position; mechanism, including a normally quiescent actuating shaft, controlled by the second follower and operative to connect the web of the running roll to the new roll and to sever said web; and means actuated from said shaft to influence the variable speed means for reduction of the speed of the first follower to normal immediately upon the web severance and connection.

41. In paper replenishing mechanism for printing presses, means for bodily displacing a running paper roll, upon nearing exhaustion, from a normal position to another position in the press; means for moving a new paper roll into the position vacated by the running roll; mechanism for connecting the web of the running roll to the new roll and for severing said web, including a normally-quiescent shaft with a rotary actuator thereon, an arm adapted to be oscillated by the rotary actuator, a pivoted severing blade, a spring tending to thrust the blade into cutting position, a latch on the arm to normally restrain the blade, a web deflector, and means on said arm operative as the latter is moved in one direction to release the blade for severance of the web of the running web with concurrent actuation of the deflector to connect the trailing end of said web to the new roll, and, as said arm is moved in the other direction, to restore the knife and the deflector to their original positions; drive means for the shaft; means automatically operative when the running roll is exhausted to temporarily connect the shaft to the drive means; and means for confining the shaft to a single revolution for each replenishing cycle.

42. In paper replenishing mechanism for printing presses, means for bodily displacing a running paper roll, upon nearing exhaustion, from a normal position to another position in the press; means for moving a new paper roll into the position vacated by the running roll; mechanism for connecting the web of the running roll to the new roll and for severing said web including a normaly quiescent shaft with a rotary actuator thereon, an arm adapted to be oscillated by the rotary actuator, a pivoted severing blade, a spring tending to thrust the blade into cutting position, a latch on the arm to normally restrain the blade, a web deflector, and means on said arm operative as the latter is moved in one direction to release the blade for severance of the web of the running web with concurrent actuation of the deflector to connect the trailing end of said web to the new roll, and, as said arm is moved in the other direction, to restore the knife and the deflector to their original position; a continuously-revolving drive shaft; a clutch; means automatically operative when the running roll is exhausted to actuate the clutch for connection of the first mentioned shaft to the drive shaft; and means for automatically releasing the clutch to disconnect said first mentioned shaft upon performance of the web severing and connecting operation by said mechanism.

43. In paper replenishing mechanism for printing presses, means for bodily displacing a running paper roll, upon nearing exhaustion, from a normal position to another position in the press; means for moving a new paper roll into the position vacated by the running roll; mechanism for connecting the web of the running roll to the new roll and for severing said web including a normally-quiescent shaft with a rotary actuator thereon, an arm adapted to be oscillated by the rotary actuator, a pivoted severing blade, a spring tending to thrust the blade into cutting position, a latch on the arm to normally restrain the blade, a web deflector, and means on said arm operative as the latter is moved in one direction to release the blade for severance of the web of the running web with concurrent actuation of the deflector to connect the trailing end of said web to the new roll, and, as said arm is moved in the other direction, to restore the knife and the deflector to their original positions; a continuously-revolving drive shaft; a clutch; a follower running in contact with the running roll in displaced position; means automatically operated by the follower upon substantial exhaustion of the running roll to actuate the clutch for connection of the first mentioned shaft to the drive shaft; and means for automatically releasing the clutch to disconnect the first mentioned shaft upon performance of the web severing and connecting operation by said mechanism.

44. In paper replenishing mechanism for printing presses, means for bodily displacing a running paper roll, upon nearing exhaustion, from a normal position to another position in the press; means for moving a new paper roll into the position vacated by the running roll; mechanism for connecting the web of the running roll to the new roll and for severing said web, including a normally-quiescent shaft with a rotary actuator thereon, an arm adapted to be oscillated by the rotary actuator, a pivoted severing blade, a spring tending to thrust the blade into cutting position, a latch on the arm to normally restrain the blade, a web deflector, and means on said arm operative as the latter is moved in one direction to release the blade for severance of the web of the running web with concurrent actuation of the deflector to connect the trailing end of the web to the new roll, and, as said arm is moved in the other direction, to restore the knife and the deflector to their original positions; a continuously-revolving drive shaft; a clutch; a follower running in contact with the running roll in displaced position; a switch on the follower; a solenoid energized by closing of the switch upon exhaustion of the running roll; means actuated by the solenoid to operate the clutch for connection of the first mentioned shaft to the drive shaft; and means for automatically releasing the clutch to disconnect said first mentioned shaft upon performance of the web severing and connecting operation by said mechanism.

45. In paper replenishing mechanism for printing presses, means for bodily displacing a running paper roll, upon nearing exhaustion, from a normal position to another position in the press; means for moving a new paper roll into the position vacated by the running roll; mechanism for connecting the web of the running roll to the new roll and for severing said web, including a normally-quiescent shaft with a rotary actuator thereon, an arm adapted to be oscillated by the rotary actuator, a pivoted severing blade, a spring tending to thrust the blade into cutting position, a latch on the arm to normally restrain the blade, a web deflector, and means on said arm operative as the latter is moved in one direction to release the blade for severance of the web of the running web with concurrent actuation of the deflector to connect the trailing end of the web to the new roll, and, as said arm is moved in the other direction, to restore the knife and the deflector to their original positions; means for bringing the new roll up to speed preparatory to the severing and connecting operation; a rotary cam on the axis of the new roll; an arm normally out of the path of the cam; a follower engaging the running roll in displaced position; means actuated by the follower upon exhaustion of the running roll to momentarily move the last mentioned arm into the path of the cam; a drive shaft; means influenced by said last mentioned arm to actuate the clutch for connection of the first mentioned shaft to the drive shaft; and means for automatically releasing the clutch to disconnect said first mentioned shaft upon performance of the web severing and connecting operation by said mechanism.

46. In paper replenishing mechanism for printing presses, means for bodily displacing a running paper roll, upon nearing exhaustion, from a normal position to another position in the press; means for moving a new paper roll into the position vacated by the running roll; mechanism for connecting the web of the running roll to the new roll and for severing said web, including a normally-quiescent shaft with a rotary actuator thereon, an arm adapted to be oscillated by the rotary actuator, a pivoted severing blade, a spring tending to thrust the blade into cutting position, a latch on the arm to normally restrain the blade, a web deflector, and means on said arm operative as the latter is moved in one direction to release the blade for severance of the web of the running web with concurrent actuation of the deflector to connect the trailing end of the web to the new roll, and, as said arm is moved in the other direction, to restore the knife and the deflector to their original positions, means for bringing the new roll up to speed preparatory to the severing and connecting operation; a rotary cam on the axis of the new roll; an arm normally out of the path of the cam; a follower engaging the running roll in displaced position; a switch on the follower; a solenoid energized by closing of the switch upon exhaustion of the running roll and operative to momentarily move the last mentioned arm into the path of the cam; means influenced by said last mentioned arm to actuate the clutch for connection of the first mentioned shaft to the drive shaft; and means for automatically releasing the clutch to disconnect said first mentioned shaft upon performance of the web severing and connecting operation by said mechanism.

REGINALD R. MILLER.